US006960272B1

(12) United States Patent
Tokas et al.

(10) Patent No.: US 6,960,272 B1
(45) Date of Patent: Nov. 1, 2005

(54) CONTACT METATHESIS POLYMERIZATION

(75) Inventors: Edward F. Tokas, Cary, NC (US); Ken C. Caster, Apex, NC (US); Mark A. Weih, Holly Springs, NC (US)

(73) Assignee: Lord Corporation, Cary, NC (US)

( * ) Notice: Subject to any disclaimer, the term of this patent is extended or adjusted under 35 U.S.C. 154(b) by 189 days.

(21) Appl. No.: 09/711,692

(22) Filed: Nov. 13, 2000

Related U.S. Application Data

(62) Division of application No. 09/209,706, filed on Dec. 11, 1998.

(51) Int. Cl.[7] .......................... B32B 31/12; B29D 30/56
(52) U.S. Cl. .................. 156/96; 156/128.6; 156/306.9; 156/307.5; 156/307.7; 156/327; 156/910
(58) Field of Search .................. 156/306.6, 306.9, 156/307.3, 307.5, 307.7, 314, 319, 327, 910, 156/96, 128.6; 427/302

(56) References Cited

U.S. PATENT DOCUMENTS

| 2,901,099 A | * | 8/1959 | Krieble ........................ 427/302 |
| 2,978,354 A | * | 4/1961 | Lesser ........................ 427/302 |
| 3,485,655 A | * | 12/1969 | Cole et al. .................. 427/302 |
| 3,935,179 A | * | 1/1976 | Ofstead ....................... 526/141 |
| 4,727,215 A | | 2/1988 | Schrock |
| 4,902,560 A | | 2/1990 | Silver |
| 5,137,785 A | | 8/1992 | Suzuki et al. |
| 5,312,940 A | | 5/1994 | Grubbs et al. |
| 5,342,909 A | | 8/1994 | Grubbs et al. |
| 5,491,206 A | | 2/1996 | Brown-Wensley et al. |
| 5,603,985 A | | 2/1997 | Kent et al. |
| 5,609,962 A | | 3/1997 | Ouhadi |
| 5,728,785 A | | 3/1998 | Grubbs et al. |
| 6,281,307 B1 | * | 8/2001 | Muhlebach et al. ........ 526/171 |

FOREIGN PATENT DOCUMENTS

| EP | 0 063 092 A | 10/1982 |
| EP | 0 381 611 A | 8/1990 |
| EP | 0 424 833 | 10/1990 |
| EP | 0 889 107 A | 1/1999 |
| WO | WO 96/16008 | 5/1996 |
| WO | WO/ 96/16100 | 5/1996 |
| WO | WO 96/23829 | 8/1996 |
| WO | WO 97/38036 | 10/1997 |

OTHER PUBLICATIONS

Ivin, K.J. and Mol, J.C., *Olefin Metathesis and Metathesis Polymerization* , (Academic Press 1997), pp. 294-330.

(Continued)

*Primary Examiner*—Geoffrey L. Knable
(74) *Attorney, Agent, or Firm*—Edward F. Murphy, III

(57) ABSTRACT

A method for bonding a material to a first substrate surface that includes providing a catalyst at the first substrate surface and then contacting that surface with a material that undergoes a metathesis reaction to bond the material to the first substrate surface. There are two embodiments of this method—a coating process and an adhesive process. In the coating embodiment, the metathesizable material is contacted with the catalyst on the substrate surface so that it undergoes metathesis polymerization to form the coating. The adhesive process includes (a) providing a catalyst at the first substrate surface, (b) providing a metathesizable material between the first substrate surface and the second substrate surface, and (c) contacting the catalyst on the first substrate surface with the metathesizable material so that the metathesizable material undergoes a metathesis reaction and bonds the first substrate surface to the second substrate surface.

48 Claims, 2 Drawing Sheets

OTHER PUBLICATIONS

Bartz, et al., *Colloid-Bound Catalysts for Ring-Opening Metathesis Polymerization: A Combination of Homogenous and Heterogenus Properties*, Angew.Chem.Int.Ed., vol. 37, Issue 18, p. 2466 (Sep. 1998).

Weck, et al., *Ring-Opening Metathesis Polymerization from Surfaces* (Aug. 1998).

"Improving Adhesion between Poly(Dicyclopentadiene) and Carbon Fiber" Research Disclosure (Nov. 1992).

Namyong, Y.Kim, E.A. "Surface-Initiated Ring-Opening Metathesis Polymerization on $Si/SiO_2$" Macromolecules, vol. 33, No. 8, Apr. 18, 2000, pp. 2793-2795.

* cited by examiner

CONTACT METATHESIS POLYMERIZATION

This application is a divisional, of application Ser. No. 09/209,706, filed Dec. 11, 1998.

BACKGROUND OF THE INVENTION

The present invention relates to a method of bonding or coating a material to a substrate surface and to bonding together two substrate surfaces.

Despite a long history of adhesive and coating development, a need continues to exist for adhesives and coatings that provide increasingly higher bonding strengths under increasingly adverse conditions on an increasing variety of substrate surfaces.

A particular need exists for environmentally friendly aqueous or waterborne adhesive systems that avoid the use of volatile organic solvents. It has thus far been relatively difficult to develop aqueous adhesives that perform at a level equal to traditional solvent-based adhesives. One major problem associated with bonds formed from an aqueous adhesive is the relative susceptibility of the bonds to high temperature fluids and corrosive materials. Another need continues to exist for coatings or adhesives that deliver superior bonding capability at an inexpensive material cost. A further need exists for coatings or adhesives that can be applied with relatively few steps and minimal energy use. A few markets that are especially in need of a superior adhesive or coating are described below.

The manufacturing of articles, parts or assemblies that include an elastomer substrate surface bonded to another substrate surface (either another elastomer substrate or a non-elastomer substrate) typically involves placing the non-elastomer substrate in a mold, introducing a molten or liquid non-vulcanized (i.e., uncured) elastomer into the mold and then applying heat and pressure to simultaneously vulcanize the elastomer and bond it to the non-elastomer substrate. There are problems, however, with such vulcanization bonding. The molds often require a complicated design and interior profile, curing of the elastomer is slowed, there can be no incorporation of pre-compressed elastomer parts into the assembly, the assemblies undergo thermal stress, the product exiting the mold often has extra flashing that must be removed, any subsequent addition of more molded parts can significantly deteriorate the previously formed adhesive bond and there is limited process flexibility.

It would be advantageous under certain circumstances to bond the elastomer substrate surface to the other substrate surface after the elastomer substrate has been fully cured or vulcanized. This post-vulcanization bonding is sometimes referred to in the art as cold bonding. However, post-vulcanization bonding is one noticeable area in which adequate adhesive bonding is lacking, particularly when bonding to substrates made from different materials, especially metal or low surface energy materials. For example, cured ethylene-propylene-diene terpolymer rubber ("EPDM") has a low surface energy that makes wetting difficult and it includes a relatively low amount of sites such as carbon—carbon double bonds that are useful in subsequent bonding. Adhesive bonding to post-vulcanized or cured elastomers has met with limited success. Cyanoacrylate adhesives are used for post-vulcanization bonding but these suffer from well known problems in more demanding industrial applications that are subjected to harsh environmental conditions. For example, cyanoacrylates suffer from poor heat resistance, solvent resistance and flexibility (see Handbook of Adhesives, edited by Skeist, I., pp. 473–476 (3d ed. 1990)). Other post-vulcanization adhesives are solvent-based and require high temperature and long curing times. Epoxy or urethane adhesives typically require elastomer surface pretreatment such as with oxidizing flames, oxidizing chemicals or electrical/plasma discharges in order to improve bonding. These pretreatment methods, however, are costly and time consuming.

The problems outlined above with current post-vulcanization adhesive bonding indicate that there is a long-felt need for an improved post-vulcanization adhesive bonding technique.

Another adhesive bonding area in which there continues to be a need is bonding to SANTOPRENE®, a commonly-used thermoplastic elastomer ("TPE") commercially available from Advanced Elastomer Systems. Pre-cured and cured SANTOPRENE® TPE is particularly difficult to adhesively bond because it has a polyolefinic thermoplastic continuous matrix (similar to polyolefinic materials like polyethylene and polypropylene) that has an especially low surface energy of 28–30 dynes/cin according to U.S. Pat. No. 5,609,962. Bonding to more polar substrates such as metal and glass is practically impossible.

Tire retread bonding is another field in which there is a need for improvement. Tire tread replacement or retreading generally involves adhering a pre-cured or uncured retread stock to a cured tire carcass. The retread stock is placed circumferentially around the tire carcass with an uncured adhesive (known in the art as an adhesive cushion or cushion gum layer) disposed between the retread stock and the tire carcass. The resulting tire assembly is subjected to heat and pressure for a period of time to cure the adhesive cushion layer. If the retread stock is uncured, the process is occasionally referred to as "hot vulcanization" because the applied heat and pressure must be sufficiently great to vulcanize the retread stock. If the retread stock is pre-cured, the process is occasionally referred to as "cold vulcanization". Application of the heat and pressure for the adhesive cure is typically accomplished by placing the tire assembly in a mold or autoclave which can require a significant amount of heat (generally from 80°–250° C. depending on whether the retread stock is pre-cured or uncured) for a significant time period (up to 300 minutes). Reduction or complete removal of this heat and pressure step would greatly contribute to a cost reduction for tire retreading.

It also would be advantageous to have a coating that can be applied without heat or extensive surface pretreatment, coat substrate materials that cannot currently be coated, has improved adhesion to the substrate surface and provide a waterborne coating for thermoplastic olefins that does not require heating.

SUMMARY OF THE INVENTION

According to the present invention there is provided a method for bonding a material to a first substrate surface that includes providing a catalyst at the first substrate surface and contacting the catalyst on the surface with a material that undergoes a metathesis reaction to bond the material to the first substrate surface. There are two embodiments of this method—a coating process and an adhesive process.

In the coating embodiment, the metathesizable material is applied to the catalyst on the substrate surface so that it undergoes metathesis polymerization to form the coating or a component of the coating. The resulting polymerized metathesizable material itself becomes the coating or part of the coating. As used herein, "coating" denotes any material that forms a film (continuous or discontinuous) on the substrate surface and serves a functional purpose and/or aesthetic purpose. Such functional purpose could include environmental protection from corrosion, radiation, heat, solvent, etc., mechanical properties such as lubricity, electric properties such as conductive or resistive and catalystic properties. Paints are included in a "coating" according to this invention.

In the adhesive embodiment, the metathesis reaction is utilized to adhere together two distinct substrate surfaces. In particular, there is provided a method for bonding a first substrate surface to a second substrate surface comprising (a) providing a catalyst at the first substrate surface, (b) providing a metathesizable material between the first substrate surface and the second substrate surface or providing a metathesizable material as a component of the second substrate, and (c) contacting the catalyst on the first substrate surface with the metathesizable material to effect the metathesis reaction and bond the first substrate surface to the second substrate surface. According to a first adhesive embodiment as shown in FIG. 1, the metathesizable material is present as part of a composition interposed between the catalyst on the first substrate surface and the second substrate surface. In other words, the metathesizable material is similar to a conventional adhesive in that it is a composition that is distinct from the two substrates when applied. According to a second adhesive embodiment as shown in FIG. 2, the second substrate is made from or includes the metathesizable material and contacting this second substrate with the catalyst on the first substrate surface creates an adhesive interlayer between the first and second substrates. The adhesive interlayer comprises a thin layer of the metathesizable second substrate that has undergone metathesis.

There is also provided a manufactured article that includes a first substrate surface, a second substrate surface and an adhesive layer interposed between and bonding the first and second substrate surfaces, wherein the first substrate surface comprises an elastomeric material and the adhesive layer comprises a metathesis polymer.

The invention offers the unique ability to form a strong adhesive bond on a variety of substrate surfaces (including difficult-to-bond post-vulcanized elastomeric materials and thermoplastic elastomers) at normal ambient conditions with a minimal number of steps and surface preparation. The method also avoids the use of volatile organic solvents since it is substantially 100 percent reactive and/or can be done with aqueous carrier fluids.

The adhesive method of the invention is especially useful to make a tire laminate wherein the catalyst is applied to a tire tread or tire carcass, the metathesizable material is applied to the tire tread or tire carcass to which the catalyst has not been applied, and the catalyst-applied tire tread or tire carcass and the metathesizable material-applied tire tread or tire carcass are bonded together. This method allows for tire retreading with no or minimal heat and pressure, does not require significant curing time and should reduce the cost of equipment installation.

According to further embodiment of the invention, the method can be used to make multilayer structures for either coating or adhesive applications. In this embodiment, the catalyst and the metathesizable material are initially applied to the first substrate surface as described above. The catalyst site, however, propagates within the coating layer where it remains as a stable active site for a subsequent reaction with a metathesizable material. In other words, active catalyst remains on the new surface that has been created from the metathesizable material. A second metathesizable material then is contacted with this "living" surface and another new layer is created. This process can be repeated until the concentration of active catalyst remaining on the surface has diminished to a level that is no longer practically useful. It should be noted that the catalysts typically are not consumed or deactivated and thus there may be no need for excess catalyst.

DETAILED DESCRIPTION OF THE PREFERRED EMBODIMENTS

Figure 1:
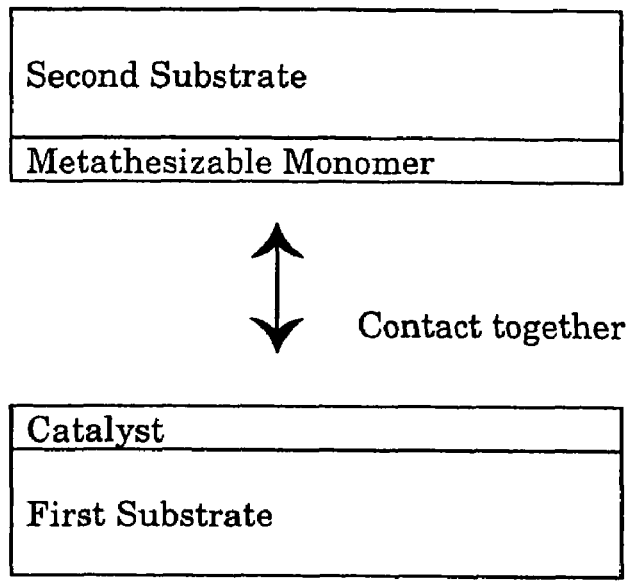
FIG. 1 depicts a preferred embodiment of a first embodiment of a process for bonding two substrates according to the invention.

Unless otherwise indicated, description of components in chemical nomenclature refers to the components at the time of addition to any combination specified in the description, but does not necessarily preclude chemical interactions among the components of a mixture once mixed.

As used herein, the following terms have certain meanings:

"ADMET" means acyclic diene olefin metathesis;

"catalyst" also includes initiators, co-catalysts and promoters;

"coating" includes a coating that is intended to be the final or outer coating on a substrate surface and a coating that is intended to be a primer for a subsequent coating;

"fibrous substrate" means a woven or non-woven fabric, a monofilament, a multifilament yarn or a fiber cord;

"filmogenic" means the ability of a material to form a substantially continuous film on a surface;

"metathesizable material" means a single or multi-component composition that includes at least one component that is capable of undergoing a metathesis reaction;

"non-fibrous substrate" means any substrate type other than a fiber (non-fibrous substrate includes a composite substrate that includes fibers as one component such as fiber-reinforced plastics);

"normal ambient conditions" means temperatures typically found in minimal atmosphere control workplaces (for example, about −20° C. to about 40° C.), pressure of approximately 1 atmosphere and an air atmosphere that contains a certain amount of moisture;

"ROMP" means ring-opening methathesis polymerization;

"room temperature" means about 10° C. to about 40° C., typically about 20° C. to about 25° C.;

"substantially cured elastomer" and "post-vulcanized elastomer" are used interchangeably and means thermoset polymers above $T_g$ for that polymer and thermoplastic polyolefins (substantially cured or post-vulcanized elastomers typically are not capable of flow); and "surface" means a region of a substrate represented by the outermost portion of the substrate defined by material/ air interface and extending into the substrate from about 1 atomic layer to many thousands of atomic layers.

The bonding or coating adhering that takes place according to the present invention occurs via a metathesis reaction. Various metathesis reactions are described in Ivin, K. J. and Mol, J. C., *Olefin Metathesis and Metathesis Polymerization* (Academic Press 1997). The metathesis reaction could be a cross-metathesis reaction, an ADMET, a ring-closing metathesis reaction or, preferably, a ROMP. It should be recognized that the surface metathesis polymerization that occurs in this invention is very different than bulk (including reaction injection molding), emulsion or solution metathesis polymerization in which a metathesizable monomer and a catalyst are mixed together into a single composition to effect the metathesis reaction. Bulk metathesis polymerization, particularly reaction injection molding, of norbornene monomer for producing molded articles made of the resulting polynorbornene is known. For example, U.S. Pat. No. 4,902,560 teaches a method for making a glass fiber-reinforced polydicyclopentadiene article that involves saturating an uncoated woven glass fabric with a polymerizable liquid that includes dicyclopentadiene monomer and catalyst, subjecting the saturated fabric to reaction injection molding and post-curing the resultant structure. According to the present invention, the resulting metathesis polymer forms a filmogenic adhesive or coating rather than a molded article.

The metathesizable material used in the invention is any material that is capable of undergoing metathesis when contacted with a proper catalyst. The metathesizable material may be a monomer, oligomer, polymer or mixtures thereof. Preferred metathesizable materials are those that include at least one metathesis reactive functional group such as olefinic materials. The metathesizable material or component can have a metathesis reactive moiety functionality ranging from 1 to about 1000, preferably from about 1 to about 100, more preferably from about 1 to 10, mol metathesizable moiety/mol molecule of metathesizable component. In addition, materials capable of undergoing ROMP typically have "inherent ring strain" as described in Ivin et al. at page 224, with relief of this ring strain being the driving force for the polymerization. Materials capable of undergoing ADMET typically have terminal or near-terminal unsaturation.

Illustrative metathesizable materials are those that include an unsaturated functional group such as ethene, α-alkenes, acyclic alkenes (i.e., alkenes with unsaturation at α-position or higher), acyclic dienes, acetylenes, cyclic alkenes and cyclic polyenes. Cyclic alkenes and cyclic polyenes, especially cycloolefins, are preferred. When cyclic alkenes or polyenes are the metathesizable material, the metathesis reaction is a ROMP.

A monomer or oligomer is particularly useful when the metathesizable material itself is intended to form a coating on the substrate surface or when the metathesizable material itself is intended to act as an adhesive for bonding one substrate surface to another substrate surface. Monomers are especially useful because they can diffuse into the substrate surface when they are applied. Particularly useful as monomers by themselves, as monomers for making oligomers, or for functionalizing other types of polymers, are cycloolefins such as norbornene, cycloalkenes, cycloalkadienes, cycloalkatrienes, cycloalkatetraenes, aromatic-containing cycloolefins and mixtures thereof. Illustrative cycloalkenes include cyclooctene, hexacycloheptadecene, cyclopropene, cyclobutene, cyclopentene, cyclohexene, cycloheptene, cyclononene, cyclodecene, cyclododecene, paracyclophane, and ferrocenophene. Illustrative cycloalkadienes include cyclooctadiene and cyclohexadiene. Illustrative cycloalkatrienes include cyclooctatriene. Illustrative cycloalkatetraenes include cyclooctatetraene.

Norbornene monomers are especially suitable. As used herein, "norbornene" means any compound that includes a norbornene ring moiety, including norbornene per se, norbornadiene, substituted norbornenes, and polycyclic norbornenes. As used herein, "substituted norbornene" means a molecule with a norbornene ring moiety and at least one substituent group. As used herein, "polycyclic norbornene" mean a molecule with a norbornene ring moiety and at least one additional fused ring. Illustrative norbornenes include those having structures represented by the following formulae:

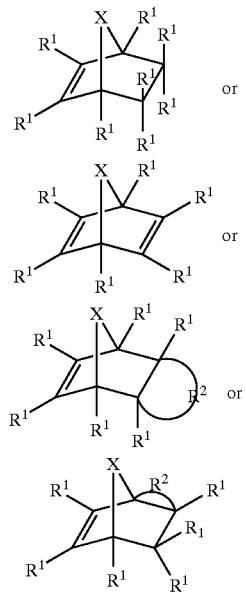

wherein X is $CH_2$, $CHR^3$, $C(R^3)_2$, O, S, N—$R^3$, P—$R^3$, O=P—$R^3$, $Si(R^3)_2$, B—$R^3$ or As—$R^3$; each $R^1$ is independently H, $CH_2$, alkyl, alkenyl (such as vinyl or allyl), cycloalkyl, cycloalkenyl, aryl, alkaryl, aralkyl, halogen, halogenated alkyl, halogenated alkenyl, alkoxy, oxyalkyl, carboxyl, carbonyl, amido, (meth)acrylate-containing group, anhydride-containing group, thioalkoxy, sulfoxide, nitro, hydroxy, keto, carbamato, sulfonyl, sulfinyl, carboxylate, silanyl, cyano or imido; $R^2$ is a fused aromatic, aliphatic or hetero cyclic or polycyclic ring; and $R^3$ is alkyl, alkenyl, cycloalkyl, cycloalkenyl, aryl, alkaryl, aralkyl or alkoxy. The carbon-containing R groups may have up to about 20 carbon atoms.

Exemplary substituted norbornene monomers include methylidenenorbornene, 5-methyl-2-norbornene, 5,6-dimethyl-2-norbornene, 5-ethyl-2-norbornene, 5-butyl-2-norbornene, 5-hexyl-2-norbornene, 5-octyl-2-norbornene, ethylidenenorbornene, 5-dodecyl-2-norbornene, 5-isobutyl-2-norbornene, 5-octadecyl-2-norbornene, 5-isopropyl-2-norbornene, 5-phenyl-2-norbornene, 5-p-toluyl-2-norbornene, 5-α-naphthyl-2-norbornene, 5-cyclohexyl-2-norbornene, 5-isopropenyl-norbornene, 5-vinyl-norbornene, 5,5-dimethyl-2-norbornene, 5-norbornene-2-carbonitrile, 5-triethoxysilyl-2-norbornene, 5-norborn-2-yl acetate, 7-oxanorbornene, 5-norbornene-2,3-carboxylic acid, 5-norbornene-2,2-dimethanol, 2-benzoyl-5-norbornene, 5-norbornene-2-methanol acrylate, 2,3-di(chloromethyl)-5-norbornene, 2,3-hydroxymethyl-5-norbornene di-acetate and their stereoisomers and mixtures thereof.

Exemplary polycyclic norbornene monomers include tricyclic monomers such as dicyclopentadiene and dihydrodicyclopentadiene, tetracyclic monomers such as tricyclopentadiene, pentacyclic monomers such as tetracyclopentadiene and tetracyclododecene, hexacyclic monomers such as pentacyclopentadiene, heptacyclic monomers such as hexacycloheptadecene, and the corresponding substituted polycyclic norbornenes. Structures of exemplary cycloolefins are shown below.

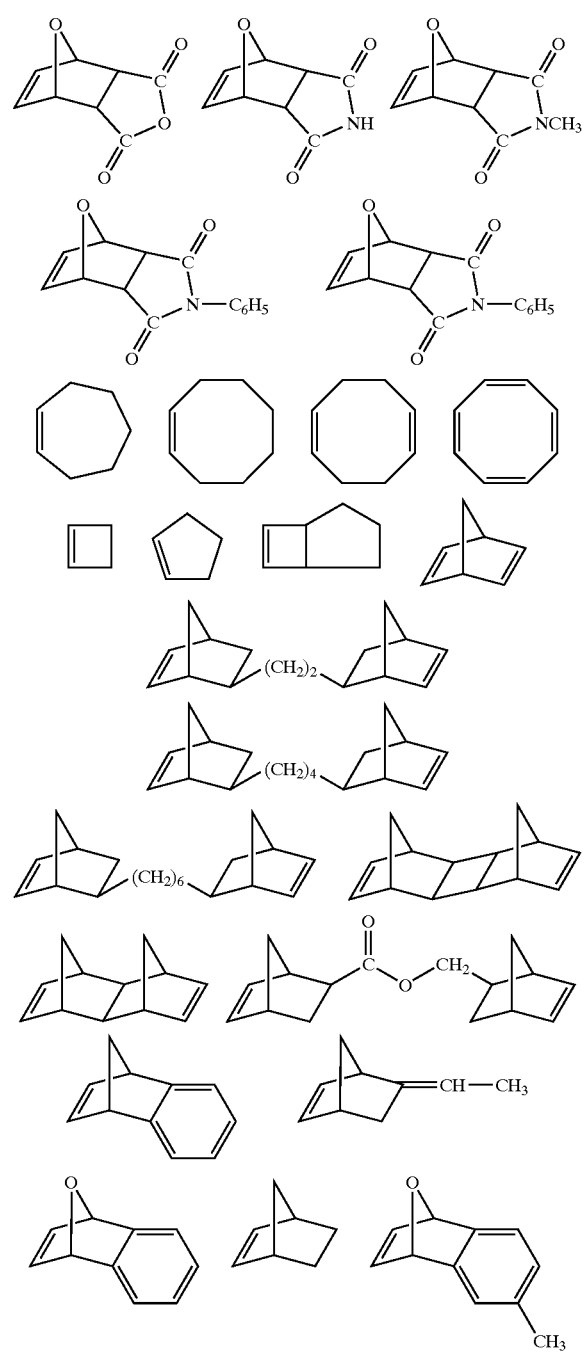

-continued

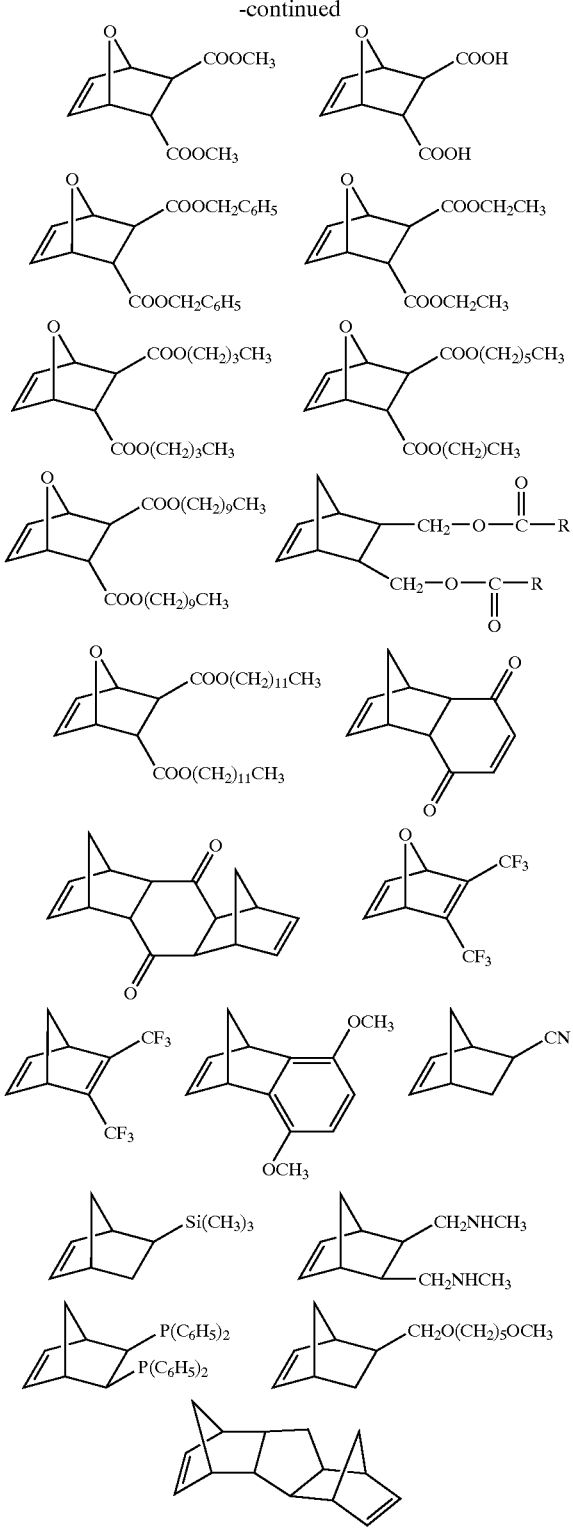

A preferred metathesizable monomer is ethylidenenorbornene, particularly 5-ethylidene-2-norbornene monomer (referred to herein as "ENB"), and dicyclopentadiene (referred to herein as "DCPD"). Ethylidenenorbornene surprisingly provides superior performance over a wide variety of substrates.

When used as a coating or an adhesive the metathesizable monomer or oligomer may be used by itself in a substantially pure form or technical grade. Of course, as described below the metathesizable monomer or oligomer can be included in a mixture with other components or it can be substantially diluted with a solvent or carrier fluid. As used herein, "technical grade" means a solution that includes at least about 90 weight % monomer or oligomer. The advantage of using a technical grade is that the metathesizable composition is approximately 100% reactive and thus there are no workplace or environmental problems caused by volatile organic compounds or performance problems caused by non-reactive additives and there is no need for purification.

Alternatively, the metathesizable monomer or oligomer can be included in a multi-component composition such as an emulsion, dispersion, solution or mixture. In other words, the metathesizable material can be a multi-component composition that includes at least one metathesizable component such as a metathesizable monomer or oligomer. Preferably, such metathesizable component-containing composition is in the form of a liquid, paste or meltable solid when it is applied. The metathesizable liquid composition can be prepared by mixing together the components according to conventional means and then can be stored for an extended time period prior to use (referred to herein as "shelf life").

For example, the metathesizable monomer can be dissolved or dispersed in conventional organic solvents such as cyclohexane, methylene chloride, chloroform, toluene, tetrahydrofuran, N-methylpyrrolidone, methanol, ethanol or acetone or in water. One particularly useful composition could include the metathesizable monomer/oligomer dissolved in a polymer such as a polyester, polyurethane, polycarbonate, epoxy or acrylic. The metathesizable component can also be included in a multi-component composition wherein the metathesis polymerization occurs in the presence of a pre-formed and/or simultaneously forming material resulting in the formation of an interpenetrating polymer network (IPN).

The metathesizable composition (either monomer alone or multi-component) preferably is substantially about 100% solids. In other words, the composition does not include substantially any liquid amount that does not react to form a solid.

The amount of metathesizable material applied to a substrate surface should be sufficient to form a continuous film in the case of a coating or provide adequate bonding in the case of an adhesive. The amount varies depending upon a variety of factors including substrate type and desired properties but it could range from 0.01 to 1,000, preferably, 0.1 to 100 and more preferably 0.3 to 25 mg/cm$^2$ substrate surface area.

Figure 2:
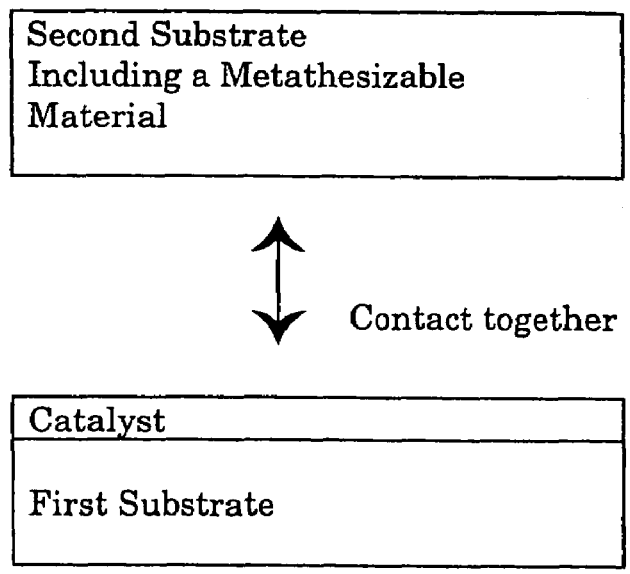
FIG. 2 depicts a second embodiment of a process for bonding two substrates according to the invention.
Figure 3:
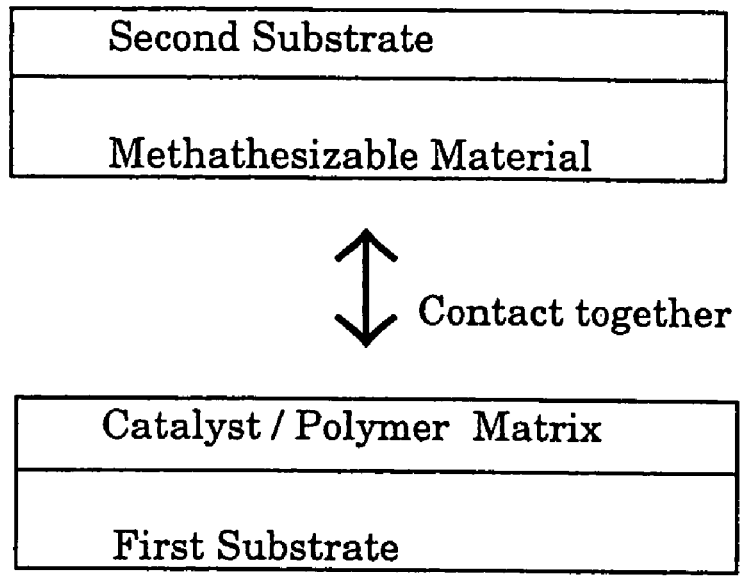
FIG. 3 depicts a bonding process according to the invention wherein the catalyst is included in a polymer matrix.
Figure 4:
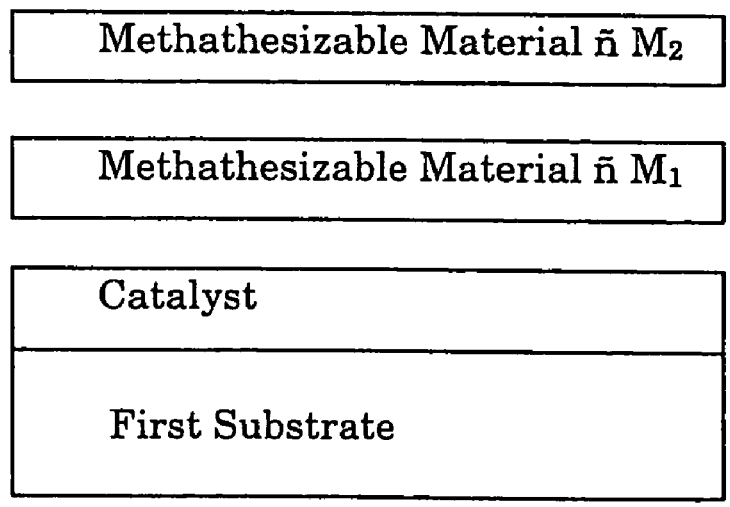
FIG. 4 depicts a "living" coating process according to the invention.

According to another embodiment shown in FIG. 2, the second substrate for bonding to the first substrate includes a metathesizable component. The metathesizable material can be present as a chemically- or ionically-bonded portion of the substrate material or it can be present simply in the form of a physical mixture (e.g., hydrogen bonding).

Any catalyst that is capable of polymerizing the metathesizable material upon contact can be used. The catalyst should also have good stability after it is applied to the substrate surface. In particular for normal ambient conditions bonding, the catalyst should be capable of maintaining its activity in the presence of oxygen and moisture for a reasonable period of time after application to the substrate material and until the metathesizable material is brought into contact with the catalyst. Experimental tests have indicated that certain catalysts can remain active for at least 30 days after coating on the substrate surface.

There are numerous known metathesis catalysts that might be useful in the invention. Transition metal carbene catalysts are well known. Illustrative metathesis catalyst systems include rhenium compounds (such as $Re_2O_7/Al_2O_3$, $ReCl_5/Al_2O_3$, $Re_2O_7/Sn(CH_3)_4$, and $CH_3ReO_3/Al_2O_3$—$SiO_2$); ruthenium compounds (such as $RuCl_3$, $RuCl_3$(hydrate), $K_2[RuCl_5$—$H_2O]$, $[Ru(H_2O)_6](tos)_3$ ("tos" signifies tosylate), ruthenium/olefin systems (meaning a solution or dispersion of preformed complex between Ru and olefin (monomer) that also includes a β-oxygen in the presence or absence of a soluble or dispersed polymer where the polymer can be an oligomer or higher molecular weight polymer prepared by metathesis or other conventional polymerization synthesis), and ruthenium carbene complexes as described in detail below); osmium compounds (such as $OsCl_3$, $OsCl_3$(hydrate) and osmium carbene complexes as described in detail below); molybdenum compounds (such as molybdenum carbene complexes (such as t-butoxy and hexafluoro-t-butoxy systems), molybdenum pentachloride, molybdenum oxytrichloride, tridodecylammonium molybdate, methyltricaprylammonium molybdate, tri(tridecyl)ammonium molybdate, and trioctylammonium molybdate); tungsten compounds (such as tungsten carbene complexes (such as t-butoxy and hexafluoro-t-butoxy systems), $WCl_6$ (typically with a co-catalyst such as $SnR_4$ (R signifies alkyl) or $PbR_4$), tungsten oxytetrachloride, tungsten oxide tridodecylammonium tungstate, methyltricaprylammonium tungstate, tri(tridecyl)ammonium tungstate, trioctylammonium tungstate, $WCl_6/CH_3CH_2OH/CH_3CH_2AlCl_2$, $WO_3/SiO_2/Al_2O_3$, $WCl_6/2,6$-$C_6H_5$—$C_6H_5OH/SnR_4$, $WCl_6/2,6$-Br—$C_6H_3OH/SnR_4$, $WOCl_4/2,6$-$C_6H_5$—$C_6H_5OH/SnR_4$, $WOCl_4/2,6$-Br—$C_6H_3OH/SnR_4$); $TiCl_4$/aluminum alkyl; $NbO_x/SiO_2$/iso-butyl $AlCl_2$; and $MgCl_2$. As indicated above, some of these catalysts, particularly tungsten, require the presence of additional activator or initiator systems such as aluminum, zinc, lead or tin alkyl. Preferred catalysts are ruthenium compounds, molybdenum compounds and osmium compounds.

Particularly preferred are ruthenium, osmium or iridium carbene complexes having a structure represented by

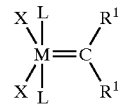

wherein M is Os, Ru or Ir; each $R^1$ is the same or different and is H, alkenyl, alkynyl, alkyl, aryl, alkaryl, aralkyl, carboxylate, alkoxy, alkenylalkoxy, alkenylaryl, alkynylalkoxy, aryloxy, alkoxycarbonyl, alkylthio, alkylsulfonyl or alkylsulfinyl; X is the same or different and is an anionic ligand group; and L is the same or different and is a neutral electron donor group. The carbon-containing substituents may have up to about 20 carbon atoms. Preferably, X is Cl, Br, I, F, CN, SCN, or $N_3$. Preferably, L is $Q(R^2)_a$ wherein Q is P, As, Sb, N or imidazolin-2-ylidene; $R^2$ is H, cycloalkyl, alkyl, aryl, alkoxy, arylate or a heterocyclic ring; and a is 1, 2 or 3. Preferably, M is Ru; $R^1$ is H, phenyl ("Ph"), —CH=$C(Ph)_2$, —CH=$C(CH_3Y_2$ or —$C(CH_3)_2Ph$; L is a trialkyl- or triaryl-phosphine or mixed alkylaryl tertiary phosphine such as $PCy_3$ (Cy is cyclohexyl or cyclopentyl), P(isopropyl)$_3$ or $PPh_3$; and X is Cl. Particularly preferred catalysts include tricyclohexyl phosphine ruthenium carbenes, especially bis(tricyclohexylphosphine)benzylidene ruthenium(IV) dichloride (designated herein by $RuCl_2(PCy_3)_2$=CHPh). Such ruthenium and osmium carbene catalysts are described, for example, in U.S. Pat. Nos. 5,312,940 and 5,342,909, both incorporated herein by reference; Schwab, P.; Grubbs, R. H.; Ziller, J. W., *Journal of the American Chemical Society*, 1996, 118, 100; Schwab, P.; France, M. B., Ziller, J. W.; Grubbs, R. H., *Angew. Chem. Int. Ed.* 1995, 34, 2039; and Nguyen, S. T.; Grubbs, R. H., *Journal of the American Chemical Society*, 1993, 115, 9858.

Another ruthenium carbene complex that may be useful is a bimetallic catalyst having a structure represented by

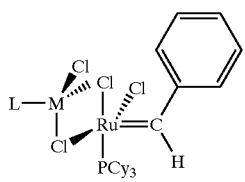

wherein L is p-cymene or 1,3-di-t-butylcyclopentadiene and M is Ru, Os or Rh. Such a catalyst is disclosed in Dias, E. L.; Grubbs, R. H., *Organometallics*, 1998, 17, 2758.

Preferred molybdenum or tungsten catalysts are those represented by the formula:

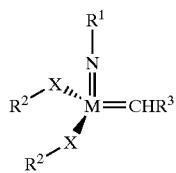

wherein M is Mo or W; X is O or S; $R^1$ is an alkyl, aryl, aralkyl, alkaryl, haloalkyl, haloaryl, haloaralkyl, or a silicon-containing analog thereof; $R^2$ are each individually the same or different and are an alkyl, aryl, aralkyl, alkaryl, haloalkyl, haloaryl, haloaralkyl, or together form a heterocyclic or cycloalkyl ring; and $R^3$ is alkyl, aryl, aralkyl or alkaryl. Preferably, M is Mo; X is O; $R^1$ is phenyl or phenyl($R^5$) wherein $R^5$ is phenyl, isopropyl or alkyl; $R^2$ is —$C(CH_3)_3$, —$C(CH_3)(CF_3)_2$,

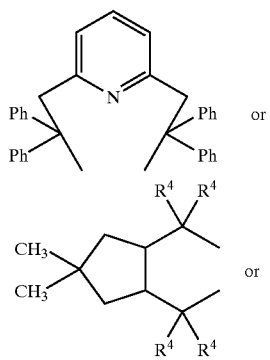

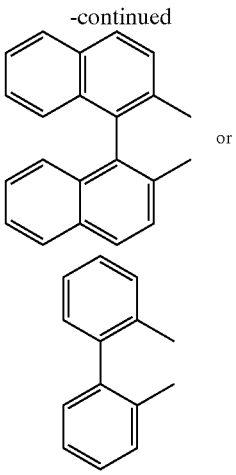

(wherein $R^4$ is phenyl, naphthyl, binaphtholate or biphenolate); and $R^3$ is —$C(CH_3)_2C_6H_5$. Particularly preferred are 2,6-diisopropylphenylimidoneophylidene molydenum (VI) bis(hexafluoro-t-butoxide) (designated herein as "MoHFTB") and 2,6-diisopropylphenylimidoneophylidene molydenum (VI) bis(t-butoxide) (designated herein as "MoTB"). Such molybdenum catalysts are described in Bazan, G. C., Oskam, J. H., Cho, H. N., Park, L. Y., Schrock, R. R., *Journal of the American Chemical Society*, 1991, 113, 6899 and U.S. Pat. No. 4,727,215.

The catalyst can be delivered at the surface of the substrate by any method. Typically the catalyst is applied in a liquid composition to the substrate surface. The catalyst in its substantially pure form may exist as a liquid or solid at normal ambient conditions. If the catalyst exists as a liquid, it may be mixed with a carrier fluid in order to dilute the concentration of the catalyst. If the catalyst exists as a solid, it may be mixed with a carrier fluid so that it can be easily delivered to the substrate surface. Of course, a solid catalyst may be applied to the surface without the use of a liquid carrier fluid. The preferred $RuCl_2(PCy_3)_2$=CHPh, homobimetallic ruthenium, MoHFTB and MoTB catalysts exist as solids at normal ambient conditions and thus are usually mixed with carrier fluids. The catalyst composition could also be considered a primer in the sense that it primes the substrate surface for subsequent application of a coating or an adhesive.

Alternatively, the catalyst may also be mixed in bulk with the substrate material. If the catalyst is mixed in bulk with the substrate material, it is preferably exuded or "bled" towards the surface of the substrate. One method for making such a catalyst-containing substrate is to mix the catalyst in bulk with the substrate material and then form the resulting mixture into the substrate article via molding, extrusion and the like. Of course, the catalyst cannot be deactivated by the composition of the substrate material or by the method for making the substrate article.

The present invention preferably does not require any pre-functionalization of the substrate surface prior to application of the catalyst. In other words, the substrate surface does not have to be reacted with any agent that prepares the surface for receiving the catalyst. For example, formation on the substrate surface of a so-called monolayer or self-assembling layer made from a material (such as a thiol) different than the catalyst or the metathesizable adhesive or coating is unnecessary. The catalyst can be applied to be in "direct contact" with the substrate surface. Of course, for metallic substrates the substrate surface can be pre-treated with conventional cleaning treatments or conversion treatments and for elastomer substrates the surface can be solvent-wiped.

The catalyst may be dispersed, suspended or dissolved in the carrier fluid. The carrier fluid may be water or any conventional organic solvent such as dichloroethane, toluene, methyl ethyl ketone, acetone, tetrahydrofuran, N-methylpyrrolidone, 3-methyl-2-oxazolidinone, 1,3-dimethylethyleneurea, 1,3-dimethylpropyleneurea and supercritical carbon dioxide. Ruthenium, osmium and iridium catalysts are particularly useful in polar organic and aqueous carrier systems. The carrier fluid can be capable of evaporating from the substrate surface under normal ambient conditions or upon heating.

The amount of catalyst applied to the substrate should be sufficient to effect the metathesis polymerization. The amount varies depending upon a variety of factors including substrate type and desired properties but it could range from 0.001 to 10, preferably, 0.01 to 5 and more preferably 0.1 to 5 mg/cm² substrate surface area.

The adhesive or coating of the invention offers numerous ease-of-use advantages. The metathesis polymerization occurs under normal ambient conditions in air regardless of whether moisture is present. There is no need for an exterior energy source such as radiation, thermal or photochemical for curing to produce the adhesive or coating. Thus, the adhesive or coating will adhere to thermally or solvent sensitive surfaces. In addition, there are a minimal number of steps according to the invention. There is no need to initially react the substrate surface to form any particular type of functional groups oil the surface. There is no need for multiple, carefully controlled steps required for forming so-called monolayers or self-assembling layers. The bond formed by the method of the invention displays remarkable adhesive strength considering the ease-of-use of the method.

A further significant advantage is that the method of the invention is environmentally-friendly. The catalyst can be delivered to the substrate surface with an aqueous carrier fluid. Substantially pure or technical grade metathesizable monomer/oligomer can be used and the monomer/oligomer is substantially 100% reactive. Consequently, there are substantially no volatile organic solvents used according to one embodiment of the invention.

Although not bound by any theory, it is believed that the adhesive or coating formed according to the invention achieves its remarkable bonding due to a number of factors. The monomer and/or catalyst diffuses readily into the substrate surface, particularly elastomeric substrates. As a result of this diffusion, an interpenetrating network develops between the polymer chains formed from the metathesizable material and molecular structure of the substrate material. Moreover, the metathesis polymerization reaction may well also encourage the formation of strong covalent bonds formed between molecules of the metathesizable material and molecules of the substrate. A unique advantage of the coating is its excellent adherence to the substrate surface.

The adhesive or coating is an addition polymer formed via the metathesis reaction. The resulting polymer should be capable of forming a continuous film. Olefin metathesis typically yields polymers having an unsaturated linear backbone. The degree of unsaturation functionality of the repeat backbone unit of the polymer is the same as that of the monomer. With a norbornene reactant, the resulting polymer should have a structure represented by:

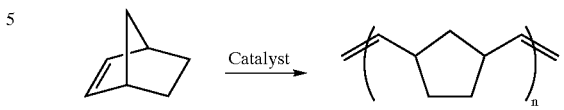

wherein n can be 1 to 20,000, preferably 1 to 500, more preferably 1 to 100, and most preferably 10 to 100. The molar ratio of norbornene reactant to catalyst should range from 20,000:1 to 1:1, preferably 500:1 to 1:1, and most preferably 100:1 to 10:1.

The resulting polymer film can be brittle, but surprisingly superior bonding occurs even with flexible substrates. It appears that any cracking of the film does not propagate into the substrate.

According to a preferred embodiment of the invention the liquid catalyst (either by itself or as a component of a multi-component catalyst composition) is applied to the substrate surface. The catalyst can be applied to achieve continuous surface coverage or coverage only in predetermined selected areas by any conventional coating/printing means such as spraying, dipping, brushing, wiping, roll-coating or the like. The metathesizable material can be contacted with the resulting catalyzed-coated surface when it is still wet. However, the catalyst carrier fluid preferably is allowed to evaporate and then the metathesizable material is applied to the dry catalyzed-coated surface. Evaporation of the catalyst carrier fluid can occur over time in normal ambient conditions or it can be accelerated by subjecting the catalyst-coated surface to heat or vacuum. A noteworthy advantage of the invention is that the dry catalyst-coated surface remains stable and active for an extended period of time. Although not wishing to be bound by specific limits, it is believed that the dry catalyst-coated surface should retain its activity for at least five minutes, preferably at least 24 hours, more preferably for at least 1 month, and most preferably for at least 6 months. This stability contributes to manufacturing flexibility by providing a relatively long time period during which the metathesizable material may be contacted with the catalyzed surface. For example, a series of substrates can be coated with the catalyst and then stored until needed for coating or bonding. In an alternative embodiment, the catalyst and the metathesizable material can be simultaneously spray applied to the substrate surface.

Once the catalyst has been made available at the substrate surface, the metathesizable material (whether in the form of a second substrate, coating or adhesive) is brought into contact with the catalyst on the substrate surface. The metathesizable material typically begins to react upon contact with the catalyst. Film formation is caused by the metathesis polymerization of the metathesizable material to form a substantially linear polymer. The film-forming rate could be accelerated by addition of either Brønsted acids, Lewis acids or CuCl to either the catalyst composition or the metathesizable composition. Methods for contacting the metathesizable material to the catalyst-coated substrate surface depend upon the intended application.

If the metathesizable material is itself intended to form a coating, then it can be applied in a liquid form under normal ambient conditions to the catalyst-coated substrate surface by any conventional coating/printing means such as spraying, dipping, brushing, wiping, roll-coating or the like. The metathesizable coating material also could be applied by extrusion if it is in the form of a molten material. The coating thickness can be varied according to intended use.

The metathesizable material, especially in the form of a monomer, can be included as a component in a multi-component exterior coating formulation such as a paint or caulk. In such a system the catalyst could be included in a primer formulation that is applied prior to the exterior coating.

If the metathesizable material is intended to form an adhesive for adhering two substrates together, the metathesizable material can be applied in a liquid form under normal ambient conditions directly to the catalyst-coated substrate surface by any conventional coating/printing means such as spraying, dipping, brushing, wiping, roll-coating or the like. The other substrate surface then is brought into contact with the metathesizable material before curing of metathesizable material is complete. Preferably, however, the metathesizable material is applied to the substrate surface that is not coated with the catalyst and the metathesizable adhesive-coated substrate and the catalyst-coated substrate can be brought into contact under normal ambient conditions to effect the adhesive bonding. The metathesizable material can be applied in a liquid form under normal ambient conditions directly to the non-catalyst-coated substrate surface by any conventional coating/printing means such as spraying, dipping, brushing, wiping, roll-coating or the like. The metathesizable material can be allowed to dry or remain wet prior to bringing the two substrates together. The metathesizable adhesive material also could be applied in both of these alternative methods by extrusion if it is in the form of a molten material. If the metathesizable material is a solid at room temperature, then it should be heated to at least partially melt or become a semi-solid in order to facilitate bonding. Pressure also could be applied to a solid metathesizable material to achieve a micro liquid surface layer.

The types of substrate surfaces that can be coated or bonded according to the invention vary widely. The substrates, of course, are articles of manufacture that are themselves useful. Such substrates could include machined parts made from metal and elastomers, molded articles made from elastomers or engineering plastics, extruded articles such as fibers or parts made from thermoplastics or thermosets, sheet or coil metal goods, fiberglass, wood, paper, ceramics, glass and the like. As used herein "substrate" does not include conventional catalyst supports made from bulk materials such as alumina or silica. Conventional catalyst supports are useful only to support a catalyst to effect polymerization, but would not be useful by themselves without the catalyst.

Illustrative elastomer substrates include natural rubber or synthetic rubber such as polychloroprene, polybutadiene, polyisoprene, styrene-butadiene copolymer rubber, acrylonitrile-butadiene copolymer rubber ("NBR"), ethylene-propylene copolymer rubber ("EPM"), ethylene-propylene-diene terpolymer rubber ("EPDM"), butyl rubber, brominated butyl rubber, alkylated chlorosulfonated polyethylene rubber, hydrogenated nitrile rubber ("HNBR"), silicone rubber, fluorosilicone rubber, poly(n-butyl acrylate), thermoplastic elastomer and the like as well as mixtures thereof.

Illustrative engineering plastic substrates useful in the invention include polyester, polyolefin, polyamide, polyimide, polynitrile, polycarbonate, acrylic, acetal, polyketone, polyarylate, polybenzimidazoles, polyvinyl alcohol, ionomer, polyphenyleneoxide, polyphenylenesulfide, polyaryl sulfone, styrenic, polysulfone, polyurethane, polyvinyl chloride, epoxy and polyether ketones.

Illustrative metal substrates include iron, steel (including stainless steel and electrogalvanized steel), lead, aluminum, copper, brass, bronze, MONEL metal alloy, nickel, zinc, tin, gold, silver, platinum, palladium and the like. Prior to application of the catalyst according to the invention the metal surface can be cleaned pursuant to one or more methods known in the art such as degreasing and gritblasting and/or the metal surface can be converted or coated via phosphatizing, electrodeposition, or autodeposition.

Illustrative fiber substrates include fiberglass, polyester, polyamide (both nylon and aramid), polyethylene, polypropylene, carbon, rayon and cotton.

Illustrative fiber-reinforced or -impregnated composite substrates include fiberglass-reinforced prepreg ("FRP"), sheet molding compound ("SMC") and fiber-reinforced elastomer composites. In the case of fiber-reinforced elastomer composites, fiber substrates can be sandwiched between and bonded to outer elastomer layers to form a composite multilayer composite structure such as tires, belts for the automotive industry, hoses, air springs and the like. The metathesizable adhesive of the invention could be used to bond fiber reinforcing cord to tire materials.

The adhesive embodiment of the invention could also be used to make fiber-reinforced or -impregnated composites themselves. For example, the catalyst can be applied to the fiber or cord and then either a separate metathesizable material is contacted with the catalyst-treated fiber or cord so as to form an adhesive with the composite matrix material or the composite matrix material is itself metathesizable.

The invention is particularly useful to adhere two substrates to each other. The types of substrates mentioned above could all be bonded together according to the invention. The substrates can each be made from the same material or from different materials. The invention is especially useful in bonding post-vulcanized or cured elastomer, particularly to a substrate made from a different material such as metal.

It has been found that superior bonding of cured elastomer substrates is obtained if the metathesizable material is applied to the cured elastomer substrate surface and then the adhesive-applied elastomer substrate is contacted with the catalyst-coated other substrate. This procedure is shown schematically in FIG. 1. This preferred method is especially applicable to bonding cured elastomer to metal and cured elastomer to cured elastomer. The catalyst is applied to the surface of the metal substrate and allowed to dry. The metathesizable adhesive is applied to the surface of the elastomer substrate. The catalyst-coated metal substrate and the adhesive-applied substrate are brought together under minimal pressure that is adequate simply to hold the substrates together and in place until the metathesis reaction initiated by contact with the catalyst has progressed to the point of curing sufficient to provide at least a "green strength" bond. Depending upon the rate of diffusion of metathesizable material into the substrate and the rate of evaporation of the metathesizable material, there may be a lapse of up to 30 minutes before the two substrates are brought together, but preferably the lapse is about 30 seconds to about 5 minutes. In the case of bonding cured EPDM to steel, green strength appears to develop within approximately five to ten minutes after the substrates are contacted together and sufficiently high bond strength appears to develop within approximately thirty minutes after the substrates are contacted together.

The bonding process of the invention is particularly useful for bonding a substrate made from a thermoplastic elastomer such as SANTOPRENE® to another thermoplastic elastomer substrate or to a substrate made from a different material. SANTOPRENE® is the trade designation of a thermoplastic elastomer ("TPE") commercially available from Advanced Elastomer Systems that consists of elastomer particles dispersed throughout a continuous matrix of thermoplastic material. Such TPE blends are described in detail in U.S. Pat. No. 5,609,962, incorporated herein by reference. As used herein, TPE also includes thermoplastic olefins ("TPO") such as those described in U.S. Pat. No. 5,073,597, incorporated herein by reference.

Polyolefins are typically the thermoplastic material used as the continuous matrix of TPE. According to the '962 patent, they are desirably prepared from monoolefin monomers having 2 to 7 carbon atoms, such as ethylene, propylene, 1-butene, isobutylene, 1-pentene, 1-hexene, 1-octene, 3-methyl-1-pentene, 4-methyl-1-pentene, 5-methyl-1-hexene, mixtures thereof and copolymers thereof with (meth) acrylates and/or vinyl acetates. Preferred are monomers having 3 to 6 carbon atoms, with propylene being preferred. The polypropylene can be highly crystalline isotactic or syndiotactic polypropylene.

A portion of the polyolefin component can be a functionalized polyolefin according to the '962 patent. In other words, non-functionalized polyolefins and functionalized polyolefins can be blended or mixed together to form the TPE. The polyolefins of the functionalized polyolefins can be homopolymers of alpha-olefins such as ethylene, propylene, 1-butene, 1-hexene and 4-methyl-1-pentene and copolymers of ethylene with one or more alpha-olefins. Preferable among the polyolefins are low-density polyethylene, linear low-density polyethylene, medium- and high-density polyethylene, polypropylene, and propylene-ethylene random or block copolymers. The functionalized polyolefins contain one or more functional groups which have been incorporated during polymerization. However, they are preferably polymers onto which the functional groups have been grafted. Such functional group-forming monomers are preferably carboxylic acids, dicarboxylic acids or their derivatives such as their anhydrides.

The elastomer component of TPE is made from olefinic rubbers such as EPM, EPDM, butyl rubber, copolymer of a $C_{4-7}$ isomonoolefin and a para-alkylstyrene, natural rubber, synthetic polyisoprene, polybutadiene, styrene-butadiene copolymer rubber, nitrile rubber, polychloroprene and mixtures thereof.

According to the '962 patent, the amount of polyolefin is generally from about 10 to about 87 weight percent, the amount of rubber is generally from about 10 to about 70 weight percent, and the amount of the functionalized polyolefin is about 3 to about 80 weight percent, provided that the total amount of polyolefin, rubber and functionalized polyolefin is at least about 35 weight percent, based on the total weight of the polyolefin, rubber, functionalized polyolefin and optional additives.

The olefin rubber component is generally present as small, e.g., micro-size, particles within a continuous polyolefin matrix. The rubber is partially crosslinked (cured) and preferably fully crosslinked or cured. The partial or full crosslinking can be achieved by adding an appropriate rubber curative to the blend of polyolefin and rubber and vulcanizing the rubber to the desired degree under conventional vulcanizing conditions. It is preferred that the rubber be crosslinked by the process of dynamic vulcanization wherein the rubber is vulcanized under conditions of high shear at a temperature above the melting point of the polyolefin component. The rubber is thus simultaneously crosslinked and dispersed as fine particles within the polyolefin matrix.

The bonding method of the invention is also particularly useful for bonding an elastomeric or plastic tire tread to an elastomeric or plastic tire carcass. As described above, tire tread replacement or retreading generally involves adhering a pre-cured or uncured retread stock directly to a cured tire carcass. The metathesizable adhesive material of the invention can be used to replace the adhesive cushion or cushion gum layer currently used in the retreading art.

The metathesis catalyst is applied to a bonding surface of either the tire carcass or a bonding surface of the tire tread and the metathesizable material is applied to the other bonding surface of the tire carcass or tire tread. Preferably, the catalyst is applied to the tire carcass and the metathesizable material is applied to the tire tread. The carcass of the used tire can be buffed by known means to provide a surface for receiving the catalyst or metathesizable material. It is preferred that the bonding surface is mildly rough or only lightly sanded. The catalyst or metathesizable material—coated retread stock is placed circumferentially around the catalyst or metathesizable-coated tire carcass. The coated surfaces then are contacted together with minimal pressure sufficient simply to hold the tread and carcass together. The tread stock and carcass can be held together during curing of the methathesis material by any conventional means in the retread art such as stapling or placing a cover or film around the tire assembly. Curing is initiated when the surfaces are contacted, green strength begins to develop within approximately five to ten minutes, and high bond strength begins to develop within approximately 15 minutes to one hour.

The resulting tire laminate includes a tire carcass or casing, a tire retread and a metathesis polymer adhesive layer between the carcass and retread. The tire laminate is useful for various types of vehicle tires such as passenger car tires, light and medium truck tires, off-the-road tires, and the like. This bonding process is also applicable to the manufacture of new tires wherein a tread is applied to a treadless tire casing or carcass. The catalyst and metathesizable material typically are applied in liquid form.

Retread or tread stock is well known in the art and can be any cured or uncured conventional synthetic or natural rubber such as rubbers made from conjugated dienes having from 4 to 10 carbon atoms, rubbers made from conjugated diene monomers having from 4 to 10 carbon atoms with vinyl substituted aromatic monomers having from 8 to 12 carbon atoms, and blends thereof. Such rubbers generally contain various antioxidants, fillers such as carbon black, oils, sulfur, accelerators, stearic acid, and antiozonants and other additives. Retread or tread stock can be in the form of a strip that is placed around the outer periphery of the concentric circular tire carcass or casing. The cured carcass is similarly well known in the art and is made from conjugated dienes such as polyisoprene or natural rubber, rubbers made from conjugated diene monomers having from 4 to 10 carbon atoms with vinyl substituted aromatic monomers having from 8 to 12 carbon atoms, and blends thereof. Such rubbers generally contain various antioxidants, fillers such as carbon black, oils, sulfur, accelerators, stearic acid, and antiozonants and other additives.

The invention will be described in more detail by way of the following nonlimiting examples. Unless otherwise indicated, the steel coupons used in the examples are made from grit-blasted, 1010 fully hardened, cold rolled steel, the cured EPDM rubber strips are available from British Tire and Rubber under the designation 96616 and all bonding and coating was performed at normal ambient conditions.

Primary adhesion of the bonded samples was tested according to ASTM-D 429 Method B. The bonded samples are placed in an Instron and the elastomeric substrate is peeled away from the other substrate at an angle of 180° at 50.88 mm (2 inches) per minute. The mean load at maximum load and the mean energy-to-break point are measured. After being pulled apart, the samples are inspected to determine the failure mode. The most desirable failure mode is rubber tear—a portion of the elastomeric material of one substrate remains on the other substrate. Rubber tear indicates that the adhesive is stronger than the elastomeric material.

EXAMPLE 1

Bonding of EPDM-To-Metal—Application of Catalyst by Drip or Flooding Process A catalyst solution was prepared by dissolving 0.021 g of $RuCl_2(PCy_3)_2$=CHPh in 1.5 ml of $CH_2Cl_2$. Three grit-blasted steel coupons were prepared by pipetting 0.5 ml of the catalyst solution via syringe onto each coupon to just cover its surface (34.9 mm×25.4 mm) and the solvent allowed to evaporate for three to four minutes in the open laboratory atmosphere. This gave ≧7 ing of $RuCl_2$ $(PCy_3)_2$=CHPh per coupon. The metal coupons were usually washed with acetone and dried prior to application of catalyst solution, but this was not required. In this example, the coupons were unwashed. EPDM rubber strips were prepared by washing the bonding surface (34.9 mm×25.4 mm) with acetone, drying at room temperature for 3 to 4 minutes, and then applying via syringe 0.03 ml of ENB to each coupon and spreading it evenly with the needle tip. The catalyst-coated metal coupon was immediately placed on top of the ENB-coated EPDM strip so that both treated surfaces contacted each other and a weight of approximately 100 gm was placed on top of the mated area. The samples sat at ambient conditions overnight. All the samples could not be pulled apart by hand. They were evaluated using a 180° peel test on an Instron and showed only EPDM rubber tear on failure. A total of 12 samples were tested and the mean load at maximum load was 273.04 (N) and the mean energy to break was 37.87 (J).

EXAMPLE 2

Bonding of EPDM-To-Metal

This testing was performed as preliminary screening to evaluate different application methods for bonding EPDM-to-metal. The process described in Example 1 was used to apply the $RuCl_2(PCy_3)_2$=CHPh catalyst solution or ENB to either a grit-blasted steel coupon or EPDM rubber strip. The results are shown below in Table 1. Based on these results, it appears that the best bonding method occurred when the catalyst was applied to the metal and the ENB was applied to the EPDM. In Table 1 the substrate type listed under the catalyst or monomer is the substrate to which the catalyst or monomer is applied.

TABLE 1

Comparison Bonding between Application Surfaces

| Catalyst | Monomer | Bond | Notes |
|---|---|---|---|
| metal | Rubber | good | Could not pull apart by hand in tension. |
| metal[a] | Metal[a] | variable | One sample pulled apart while the other two could not be pulled apart totally and showed rubber tear. |
| metal[a] | Metal[a] | variable | Fresh catalyst soln used. One sample pulled apart while the other two could not be pulled apart totally and showed rubber tear. |
| rubber | Metal | poor | Adhesion to rubber was good, poor to metal. |
| rubber[b] | Rubber[b] | poor | Adhesion to rubber was good, poor to metal. |
| rubber[b] | Rubber[b] | poor | Fresh catalyst soln used. Adhesion to rubber was good, poor to metal. |

[a]Catalyst applied to metal surface followed by application of ENB before mating.
[b]Catalyst applied to EPDM surface followed by application of ENB before mating.

EXAMPLE 3

Delayed Bonding of Substrates Coated with Catalyst

A catalyst solution was applied to grit-blasted metal coupons according to the process described in Example 1, but the catalyst-coated coupons were allowed to dry and stand in ambient conditions in the laboratory (except for being covered from dust) for 3, 10, 20 and 33 days before bonding to the EPDM with ENB. All samples showed EPDM rubber tear when subjected to the 180° peel test. The 3 day samples had a mean load at maximum load of 291.49 (N) and a mean energy to break of 39.29 (J); 10 day samples had a mean load at maximum load of 298.32 (N) and a mean energy to break of 40.18 (J); 20 day samples had a mean load at maximum load of 262.79 (N) and a mean energy to break of 35.76 (J); and the 33 day samples had a mean load at maximum load of 313.26 (N) and a mean energy to break of 48.48 (J).

EXAMPLE 4

Application of Catalyst to Substrate by Brush Process

A catalyst solution was prepared by dissolving 0.021 g of $RuCl_2(PCy_3)_2$=CHPh to 1.5 ml of $CH_2Cl_2$ in a screw-cap vial under $N_2$. This solution was applied by brush to three grit-blasted steel coupons over the surface to be bonded (34.9 mm×25.4 mm) and the solvent allowed to evaporate in the open laboratory atmosphere during the brushing process, thus leaving the catalyst powder evenly distributed over the metal coupon surface. After drying, all prepared samples were weighed to determine the amount of catalyst on the surface which was 5.8±1.8 mg per coupon. When the first-made solution was depleted, another batch of fresh catalyst solution was prepared as described above. A total of 12 samples were prepared in this manner. EPDM rubber strips were prepared by washing the bonding surface (34.9 mm×25.4 mm) with acetone, drying at room temperature for 3 to 4 minutes, and then applying via syringe 0.03 ml of ENB to each coupon and spreading it evenly with the needle tip. The catalyst-coated metal coupon was immediately placed on top of the ENB-coated EPDM strip so that both treated surfaces contacted each other and a weight of approximately 100 gm was placed on top of the mated area. The samples sat at ambient conditions overnight. The next morning, no failure was observed on attempted pulling the samples apart by hand. They were evaluated using a 180° peel test on an Instron and showed evenly distributed rubber tear on the EPDM on failure. A total of 12 specimens were tested and showed a mean load at maximum load of 283.87 (N) and mean energy to break of 41.72 (J).

EXAMPLE 5

Application of Waterborne Catalyst to Substrate

A catalyst solution was prepared by dissolving 0.015 g of $RuCl_2(PCy_3)_2$=CHPh and 0.006 g of dodecyltrimethylammonium bromide ("DTAB") surfactant (0.488 w/w %) in 1.21 g of water. The aqueous catalyst solution was brushed onto two grit-blasted metal coupons using the procedure described in Example 4 except that the coupons were heated on a hot-plate at 40° C. to aid in water removal. The coupons were cooled to room temperature and bonded to EPDM with 0.04 ml of ENB as described in Example 4. The next morning the samples could be pulled apart by hand.

In another example, a catalyst solution was prepared from 0.0272 g of $RuCl_2(PCy_3)_2$=CHPh and 0.0024 g of DTAB (0.068 w/w %) in 3.5 g of water. The aqueous catalyst solution was brushed onto three grit-blasted metal coupons as described above, cooled to room temperature, and bonded to EPDM with 0.04 ml of ENB as described in Example 4. They were evaluated using a 180° peel test on an Instron and showed rubber tear on the EPDM on failure. A total of three specimens were tested and showed a mean load at maximum load of 215.07 (N) and mean energy to break of 23.09 (J).

EXAMPLE 6

ENB Monomer Residence Time on EPDM Substrate

Bonding of EPDM to grit-blasted steel coupons was performed according to Example 1 except that 0.04 ml of ENB was allowed to stand on the EPDM surface to be bonded for 0, 2, and 4 minutes before bonding to the metal. For the 4 minute sample, an additional 0.03 ml of ENB was applied onto two of the EPDM strips since the liquid absorbed into the EPDM. All samples exhibited EPDM rubber tear when subjected to the 180° peel test. The 0 minute samples had a mean load at maximum load of 256.41 (N) and a mean energy to break of 29.45 (J); 2 minutes samples had a mean load at maximum load of 273.12 (N) and a mean energy to break of 35.34 (J); and the 4 minutes samples had a mean load at maximum load of 247.28 (N) and a mean energy to break of 22.82 (J).

EXAMPLE 7

EPDM-To-Metal Bonding Using Different Steel Substrates

Phosphatized and unprocessed 1010 steel were bonded to EPDM rubber according to the procedure described in Example 1. Bonding strength was reduced compared to grit-blasted steel, but all the samples still exhibited some EPDM rubber tear when subjected to the 180° peel strength test. The phosphatized steel samples had a mean load at maximum load of 158.69 (N) and a mean energy to break of 13.49 (J); and the unprocessed 1010 steel samples had a mean load at maximum load of 209.07 (N) and a mean energy to break of 19.88 (J).

EXAMPLE 8

Application of Catalyst to Substrate by Spray Process

A catalyst solution was prepared by dissolving 0.5 g of $RuCl_2(PCy_3)_2$=CHPh in 20 ml of $CH_2Cl_2$. The catalyst solution was sprayed onto 12 grit-blasted steel coupons in a sweeping pattern until even-appearing coverage of the surface to be bonded (34.9 mm×25.4 mm) was obtained. The solvent was allowed to evaporate for 1.5 hours in the open laboratory atmosphere. After drying, all prepared samples were weighed to determine the amount of catalyst on the surface, which was 9.0±0.95 mg per coupon. EPDM rubber strips were prepared by washing the bonding surface (34.9 mm×25.4 mm) with acetone, drying at room temperature for 3 to 4 minutes, and then applying via syringe 0.06 ml of ENB to each coupon and spreading it evenly with the needle tip. The catalyst-coated metal coupon was immediately placed on top of the ENB-coated EPDM strip so that both treated surfaces contacted each other and a weight of approximately 100 g was placed on top of the mated area. The samples sat at ambient conditions overnight. The next morning, all samples could not be pulled apart by hand and showed only EPDM rubber tear after analysis on an Instron. A total of 12 samples were tested and displayed a mean load at maximum load of 352.47 (N) and a mean energy to break of 61.23 (J).

EXAMPLE 9

EPDM-To-Metal Bonding Using Other Metals

A catalyst solution was prepared by dissolving 0.030 g of $RuCl_2(PCy_3)_2$=CHPh in 2.5 ml of $CH_2Cl_2$. The catalyst solution was applied to steel Q-panel, aluminum, and chromated aluminum metal coupons and the metal coupons were bonded to EPDM rubber strips with 0.04 ml of ENB monomer per coupon as described in Example 4. Three separate but identical batches of catalyst solution were used to prepare the metal coupons, which resulted in 7.3±1.2 mg catalyst per coupon after weighing. The specimens were analyzed on an Instron with a 180° peel test. All three metals showed a very small amount of rubber tear with adhesive failure as the primary failure mode as most of the ENB polymer film was attached to the rubber on failure. Higher bond strengths were observed with the chromated aluminum surfaces.

TABLE 2

180° Peel Test Data for EPDM-to-Steel, -Aluminum, and -Chromated Aluminum Specimens.

| Sample Type | Load at Max. Load (N) | Energy to Break (J) |
|---|---|---|
| Steel Q-Panel | 81.08 | 3.91 |
| Steel Q-Panel | 87.08 | 3.78 |
| Steel Q-Panel | 79.95 | 3.04 |
| Mean | 82.71 | 3.58 |
| Al | 84.45 | 3.59 |
| Al | 82.03 | 4.37 |
| Al | 114.25 | 6.33 |
| Mean | 93.58 | 4.76 |

TABLE 2-continued

180° Peel Test Data for EPDM-to-Steel, -Aluminum, and -Chromated Aluminum Specimens.

| Sample Type | Load at Max. Load (N) | Energy to Break (J) |
|---|---|---|
| chrom. Al | 173.28 | 13.00 |
| chrom. Al | 113.86 | 6.88 |
| chrom. Al | 144.55 | 8.54 |
| Mean | 143.89 | 9.47 |

EXAMPLE 10

Santoprene®-To-Metal Bonding Examples

A catalyst solution was prepared by dissolving 0.030 g of $RuCl_2(PCY_3)_2$=CHPh in 3.0 ml of $CH_2Cl_2$. The catalyst solution was applied to grit-blasted steel coupons and the steel coupons were bonded to three samples of four types of Santoprene® (101-64, 201-64, 201-87 and 8201-90) with 0.08 ml of ENB monomer per coupon as described in Example 4. Weighing revealed on average that 9.4±1.2 mg of catalyst was contained per coupon. The rubber surface was sanded prior to application of monomer for each type. The bonded specimens were analyzed on the Instron with the 180° peel test and the results are shown below in Table 3. All three samples of both softer rubbers, 101-64 and 201-64, showed excellent rubber tear while the stiffer rubbers, 201-87 and 8201-90, showed no rubber tear and adhesive failure was prominent with most of the ENB polymer film attached to the rubber after peeling these specimens apart. Good bond strength data were observed for all specimens.

TABLE 3

180° Peel Test Data for Rubber-to-Metal Bonded Sanded Santoprene ® Specimens.

| Sample Type | Load at Max. Load (N) | Energy to Break (J) |
|---|---|---|
| 101-64 | 106.60 | 2.49 |
| 101-64 | 98.75 | 5.60 |
| 101-64 | 105.32 | 2.25 |
| Mean | 103.56 | 3.45 |
| 201-87 | 72.76 | 3.69 |
| 201-87 | 87.64 | 3.27 |
| 201-87 | 103.56 | 3.96 |
| Mean | 87.99 | 3.64 |
| 201-64 | 72.45 | 4.09 |
| 201-64 | 114.54 | 3.30 |
| 201-64 | 90.27 | 5.41 |
| Mean | 92.42 | 4.27 |
| 8201-90 | 165.54 | 4.35 |
| 8201-90 | 165.24 | 6.02 |
| 8201-90 | 230.06 | 8.54 |
| Mean | 186.94 | 6.30 |

EXAMPLE 11

Natural Rubber-To-Grit-Blasted Steel Bonding $RuCl_2 (PCy_3)_2$=CHPh was applied to grit-blasted steel coupons and bonded with 0.10 ml of ENB monomer per coupon using the process described in Example 4. Four natural rubber samples were prepared. Two samples were sanded and two samples remained unsanded. The mated specimens were allowed sit over a two day period. On the third day, the two specimens prepared from the sanded natural rubber pulled apart by hand. A thin ENB polymer film was left on the natural rubber strip and some rubber tear was observed. The two specimens prepared from unsanded natural rubber could not be pulled apart by hand and were analyzed on the Instron using a 180° peel test. The bonded specimens had a mean load at maximum load of 183.14 (N) and a mean energy to break of 12.20 (J). Rubber tear was observed for the sample with the higher values.

EXAMPLE 12

EPDM-To-Grit-Blasted Steel Bonding with MoTB Catalyst

A catalyst solution was prepared by dissolving 0.021 g of 2,6-diisopropylphenylimido neophylidene molybdenum (VI) bis-t-butoxide (MoTB) in 2 ml of $CH_2Cl_2$. The catalyst solution was applied to grit-blasted steel coupons and then the steel coupons were bonded to EPDM rubber strips with 0.08–0.09 ml of ENB monomer per coupon as described in Example 4. Because of catalyst sensitivity to air and moisture, all handling of rubber and metal coupons and catalyst solutions was performed in a glove box under an argon atmosphere. Once bonded, the samples were kept in the glove box until mechanical tests were performed. The original grit-blasted metal and rubber coupons had been stored in the glove box for several months to ensure complete removal of any water or oxygen contamination. This was later found to be unnecessary as bonding was observed even with samples that had only a few hours residence time in the glove box. It was noted that within 5–10 seconds after mating the two surfaces, the coupons could not be moved around on top of each other suggesting that polymerization had occurred. All specimens were analyzed on an Instron using the 180° peel test. The results are means for two separate data sets: the original two bonded specimens (long residence time in the glove box)—mean load at maximum load of 46.57 (N) and mean energy to break of 1.54 (J) and three new specimens (surfaces were thoroughly washed with acetone prior to placing in the glove box followed by washing with $CH_2Cl_2$ in the box prior to addition of monomer)—mean load at maximum load of 139.26 (N) and mean energy to break of 11.12 (J). Some rubber tear was observed on all specimens except one.

EXAMPLE 13

EPDM-To-Grit-Blasted Steel Bonding Using Homobimetallic Ruthenium Catalyst

A catalyst solution was prepared by dissolving 0.030 g of $RuCl_2$(p-cymene)-$RuCl_2(PCy_3)_2$=CHPh in 3.1 ml of $CH_2Cl_2$. The catalyst solution was applied to grit-blasted steel coupons and then the steel coupons were bonded to EPDM rubber strips with 0.08 ml of ENB monomer per coupon as described in Example 4. The mated specimens were analyzed on the Instron using a 180° peel test. The bonded specimens had a mean load at maximum load of 226.60 (N) and a mean energy to break of 26.78 (J). Rubber tear was observed for all specimens.

EXAMPLE 14

EPDM-To-Grit-Blasted Steel Bonding Using DCPD as Monomer

A catalyst solution was prepared by dissolving 0.031 g of $RuCl_2(PCy_3)_2=CHPh$ in 3.2 ml of $CH_2Cl_2$. The catalyst solution was applied to grit-blasted steel coupons and the steel coupons then were bonded to EPDM rubber strips with DCPD monomer as described in Example 4. The procedure for application of the DCPD varied slightly from that with ENB. The EPDM surface was washed with acetone prior to application of DCPD monomer, which required gentle melting of the distilled dicyclopentadiene with a heat gun, pipetting the liquid onto the EPDM surface and spreading the liquid with a pipette. On cooling, the DCPD solidified. Once the monomer was applied, the DCPD coated surface was gently heated with a heat gun to melt the solid; the metal and rubber parts were immediately mated and weighted down with approximately 100 grams. The mated specimens were analyzed on the Instron using a 180° peel test. The bonded specimens had a mean load at maximum load of 290.78 (N) and a mean energy to break of 44.44 (J). Rubber tear was observed for all specimens.

EXAMPLE 15

EPDM-To-Grit-Blasted-Steel Bonding Using Methylidenenorbornene as Monomer

A catalyst solution was prepared by dissolving 0.031 g of $RuCl_2(PCy_3)_2=CHPh$ in 3.2 ml of $CH_2Cl_2$, applied to three grit-blasted steel coupons, and then the steel coupons were bonded to EPDM with 0.10 ml of methylidenenorbornene monomer per coupon as described in Example 4. The mated specimens were analyzed on the Instron using a 180° peel test. The bonded specimens had a mean load at maximum load of 40.55 (N) and a mean energy to break of 1.48 (J).

EXAMPLE 16

EPDM-To-EPDM Bonding

A catalyst solution was prepared by dissolving 0.030 g of $RuCl_2(PCy_3)_2=CHPh$ in 2 ml of $CH_2Cl_2$. The catalyst solution was applied to two EPDM strips. Each catalyst-coated EPDM strip was bonded to another EPDM strip with 0.02 ml of ENB monomer per strip as described in Example 1. The EPDM rubber strips were washed with acetone and allowed to dry prior to application of either catalyst solution or ENB monomer. Two strips were bonded in a lap-shear configuration surface (34.9 mm×25.4 mm); examination of the specimens on the next day revealed they could not be pulled apart by hand. They were then analyzed by a lap shear tensile test on an Instron after three months of standing at ambient conditions and showed an average load at break of 419.42 (N).

A catalyst solution was prepared by dissolving 0.027 g of $RuCl_2(PCy_3)_2=CHPh$ in 2.5 ml of $CH_2Cl_2$. The catalyst solution was applied to three EPDM strips. Each catalyst-coated EPDM strip was bonded to an EPDM strip with 0.07–0.10 ml of ENB monomer per strip as described in Example 4. The EPDM rubber strips were washed with acetone and allowed to dry prior to application of either catalyst solution or ENB monomer. Six specimens were bonded in 180° peel test mode. Three were sanded before bonding. All specimens bonded and could not be pulled apart by hand and were analyzed on an Instron using a 180° peel test. The sanded specimens had a mean load at maximum load of 166.51 (N) and a mean energy to break of 25.56 (J); and the unsanded specimens had a mean load at maximum load of 176.16 (N) and a mean energy to break of 26.97 (J). Failure analysis showed that the sanded specimens had rubber tear but the unsanded specimens had deeper rubber tear with chunks torn away.

EXAMPLE 17

EPDM-To-EPDM Bonding with MoTB Catalyst

Two separate catalyst solutions were prepared to self-bond unsanded and sanded EPDM specimens. The first solution was prepared by dissolving 0.0216 g of 2,6-diisopropylphenylimido neophylidene molybdenum (VI) bis-t-butoxide (MoTB) in 2 ml of $CH_2Cl_2$. The catalyst solution was applied to two unsanded EPDM rubber strips that were then bonded to EPDM rubber strips with 0.08 ml of ENB monomer per coupon as described in Example 12. The second solution was prepared by dissolving 0.0211 g of 2,6-diisopropylphenylimido neophylidene molybdenum (VI) bis-t-butoxide (MoTB) in 0.7 ml of $CH_2Cl_2$. The catalyst solution was applied to sanded EPDM rubber strips that were then bonded to EPDM rubber strips with 0.13 ml of ENB monomer per coupon as described in Example 12. All specimens were analyzed on an Instron using the 180° peel test. The results are means for two separate data sets: the original two unsanded bonded specimens (long residence time in the glove box)—mean load at maximum load of 9.41 (N) and mean energy to break of 0.27 (J) and two new specimens (surfaces were sanded prior to placing in the glove box followed by washing with $CH_2Cl_2$ in the box prior to addition of monomer)—mean load at maximum load of 12.97 (N) and mean energy to break of 0.76 (J). No rubber tear was observed on any specimen.

EXAMPLE 18

EPDM-To-EPDM Bonding Using Homobimetallic Ruthenium Catalyst and ENB

A catalyst solution was prepared by dissolving 0.031 g of $RuCl_2(p\text{-cymene})\text{-}RuCl_2(PCy_3)_2=CHPh$ in 3.1 ml of $CH_2Cl_2$. The catalyst solution was applied to three EPDM rubber strips that were then bonded to EPDM rubber strips with 0.16 ml of ENB monomer per coupon as described in Example 4. The mated specimens were analyzed on the Instron using a 180° peel test. The bonded specimens had a mean load at maximum load of 126.28 (N) and a mean energy to break of 11.38 (J). Rubber tear was observed for all specimens.

EXAMPLE 19

EPDM-To-EPDM Bonding Using DCPD as Monomer

A catalyst solution was prepared by dissolving 0.031 g of $RuCl_2(PCy_3)_2=CHPh$ in 3.1 ml of $CH_2Cl_2$. The catalyst solution was applied to three EPDM strips that were then bonded to EPDM strips with DCPD monomer as described in Examples 4 and 14. The mated specimens were analyzed on the Instron using a 180° peel test. The bonded specimens had a mean load at maximum load of 181.75 (N) and a mean energy to break of 26.46 (J). Rubber tear was observed for all specimens.

EXAMPLE 20

Rubber-To-Rubber Bonding Using Differently Cured Rubbers

A catalyst solution was prepared by dissolving 0.031 g of $RuCl_2(PCy_3)_2$=CHPh in 3.2 ml of $CH_2Cl_2$. This solution was applied to three rubber strips that were then self-bonded with ENB monomer (see Tables 4 and 5 for the amount of ENB applied to each specimen) as described in Example 4. Once this catalyst solution had been depleted, another identical batch was prepared and used to bond another three specimens. Both EPDM and natural rubber A225P strips were molded and cured to different extents of cure as shown in Tables 4 and 5. The extent cure is shown as a percentage that was determined on a Monsanto Oscillating Disk Rheometer (for example, $T_{90}$=time at 90% of maximum torque). Surface pretreatment of both surface types involved washing with acetone. The A225P was sanded while the EPDM remained unsanded. The EPDM was cured at 100, 70 and 40% and the A225P was cured at 100, 90, 70 and 40%. Instron results from the 180° peel test are shown in Tables 4 (EPDM) and 5 (A225P).

TABLE 4

180° Peel Test Data for Extent of Cure Study for EPDM-to-EPDM Specimens.

| Sample Type | Amount of Monomer (ml) | Load at Max. Load (N) | Energy to Break (J) |
|---|---|---|---|
| 100% | 0.16 | 178.58 | 24.87 |
| 100% | 0.16 | 162.50 | 23.44 |
| 100% | 0.16 | 173.38 | 24.99 |
| Mean |  | 171.48 | 24.43 |
| 70% | 0.16 | 251.00 | 65.69 |
| 70% | 0.16 | 226.94 | 52.32 |
| 70% | 0.16 | 236.04 | 57.10 |
| Mean |  | 238.07 | 58.37 |
| 40% | 0.10 | 203.10 | 50.35 |
| 40% | 0.13 | 216.24 | 52.99 |
| 40% | 0.15 | 238.01 | 63.51 |
| Mean |  | 219.11 | 55.62 |

All samples showed excellent rubber tear. However, no deep rubber tear was observed. The 40% EPDM samples showed better rubber tear when compared to the 70 and 100% samples.

TABLE 5

180° Peel Test Data for Extent of Cure Study for A225P-to-A225P Specimens.

| Sample Type | Amount of Monomer (ml) | Load at Max. Load (N) | Energy to Break (J) |
|---|---|---|---|
| 100% | 0.10 | 375.01 | 40.07 |
| 100% | 0.10 | 304.20 | 29.16 |
| 100% | 0.10 | 396.97 | 46.42 |
| Mean |  | 358.73 | 38.55 |
| 90% | 0.16 | 334.60 | 54.27 |
| 90% | 0.16 | 261.64 | 40.10 |
| 90% | 0.16 | 285.37 | 42.51 |
| Mean |  | 293.87 | 45.63 |
| 70% | 0.16 | 297.73 | 48.58 |
| 70% | 0.18 | 264.58 | 42.11 |
| 70% | 0.18 | 310.87 | 51.10 |
| Mean |  | 291.06 | 47.26 |
| 40% | 0.10 | 328.91 | 59.14 |
| 40% | 0.14 | 356.18 | 63.42 |
| 40% | 0.16 | 420.21 | 76.88 |
| Mean |  | 368.44 | 66.48 |

The 100% A225P showed good rubber tear, and the 90, 70 and 40% A225P showed deep rubber tear. It should be noted that the 100% A225P strips were approximately twice as thick as those for the other three types of cured rubber.

EXAMPLE 21

Santoprene®-To-Santoprene® Bonding

A catalyst solution was prepared by dissolving 0.030 g of $RuCl_2(PCy_3)_2$=CHPh in 2.5 ml of $CH_2Cl_2$. This solution was applied to three strips of four types of Santoprene® (101-64, 201-64, 201-87 and 8201-90), and self-bonded with ENB monomer as described in Example 4. The amount of ENB applied depended on the Santoprene® surface treatment: 0.06 ml for unsanded and 0.16 ml for sanded specimens. Once this catalyst solution had been depleted, another identical batch was prepared and used to bond another three specimens. The bonded specimens were analyzed on an Instron with the 180° peel test and the results are shown in Tables 6 and 7. All unsanded samples showed no rubber tear and displayed adhesive failure as a polymer film was observed on much of the rubber surface. All three 101-64 sanded samples showed excellent rubber tear, two 201-64 samples showed excellent rubber tear, and both stiffer rubbers, 201-87 and 8201-90, showed no rubber tear.

TABLE 6

180° Peel Test Data for Rubber-to-Rubber Using Unsanded Santoprene ® Specimens.

| Santoprene ® Type | Load at Max. Load (N) | Energy to Break (J) |
|---|---|---|
| 201-64 | 9.55 | 0.46 |
| 201-64 | 6.58 | 0.38 |
| 201-64 | 5.58 | 0.30 |
| Mean | 7.24 | 0.38 |
| 201-87 | 9.14 | 0.43 |
| 201-87 | 5.45 | 0.27 |
| 201-87 | 3.39 | 0.19 |
| Mean | 5.99 | 0.30 |
| 101-64 | 4.39 | 0.29 |
| 101-64 | 7.98 | 0.43 |
| 101-64 | 7.79 | 0.30 |
| Mean | 6.72 | 0.34 |
| 8201-90 | 7.16 | 0.14 |
| 8201-90 | 3.68 | 0.17 |
| 8201-90 | 3.00 | 0.15 |
| Mean | 4.62 | 0.15 |

TABLE 7

180° Peel Test Data for Rubber-to-Rubber Using Sanded Santoprene ® Specimens.

| Santoprene ® Type | Load at Max. Load (N) | Energy to Break (J) |
|---|---|---|
| 101-64 | 85.49 | 3.38 |
| 101-64 | 93.01 | 3.11 |
| 101-64 | 58.47 | 3.59 |
| Mean | 78.99 | 3.36 |
| 201-64 | 48.52 | 2.61 |
| 201-64 | 107.29 | 4.29 |
| 201-64 | 60.50 | 3.40 |
| Mean | 72.10 | 3.43 |
| 201-87 | 67.95 | 4.00 |
| 201-87 | 63.76 | 4.03 |
| 201-87 | 73.98 | 4.36 |
| Mean | 68.56 | 4.13 |
| 8201-90 | 29.85 | 1.69 |
| 8201-90 | 31.91 | 1.81 |
| 8201-90 | 21.82 | 1.28 |
| Mean | 27.86 | 1.60 |

EXAMPLE 22

Tire Retread Applications

A catalyst solution was prepared by dissolving 0.031 g of $RuCl_2(PCy_3)_2$=CHPh in 3.1 ml of $CH_2Cl_2$. Three types of bonding were performed: (1) tread-to-tread (2) carcass-to-carcass and (3) carcass-to-tread. For carcass-to-tread specimens, the catalyst was applied to the carcass and ENB monomer to the tread. The bonding procedure was as described in Example 4. Once the catalyst solution had been depleted another identical batch was prepared. The amount of ENB applied depended on the specimen and is shown in Tables 8 and 9. Mechanical properties were obtained on both unsanded and sanded combinations of carcass and tread stock. The bonded specimens were analyzed on an Instron with the 180° peel test. Table 8 shows data for the unsanded specimens. All unsanded samples showed rubber tear. The tread-to-tread samples showed some superficial rubber tear. The carcass-to-carcass and carcass-to-tread samples showed deep rubber tear.

TABLE 8

180° Peel Test Data for Rubber-to-Rubber Bonding Using Unsanded Carcass and Tread Stocks.

| Sample Type | Amount of Monomer (ml) | Load at Max. Load (N) | Energy to Break (J) |
| --- | --- | --- | --- |
| Tread/Tread | 0.06 | 72.84 | 6.08 |
| Tread/Tread | 0.06 | 60.79 | 4.90 |
| Tread/Tread | 0.08 | 71.18 | 7.73 |
| Mean | | 68.45 | 6.24 |
| Carcass/Carcass | 0.10 | 261.83 | 36.81 |
| Carcass/Carcass | 0.14 | 205.64 | 20.79 |
| Carcass/Carcass | 0.16 | 349.31 | 48.82 |
| Mean | | 272.27 | 35.47 |
| Carcass/Tread | 0.06 | 186.91 | 29.43 |
| Carcass/Tread | 0.08 | 134.94 | 17.99 |
| Carcass/Tread | 0.10 | 140.14 | 16.36 |
| Mean | | 154.00 | 21.26 |

Table 9 shows data for sanded specimens. These all showed rubber tear as well. However, rubber tear was deeper when compared to the unsanded specimens. The tread-to-tread samples showed the least amount of tear but still more than the unsanded version. The carcass-to-carcass samples showed excellent, deep rubber tear. Finally, the carcass-to-tread samples also showed excellent rubber tear but not as good as the carcass-to-carcass samples.

TABLE 9

180° Peel Test Data for Rubber-to-Rubber Bonding Using Sanded Carcass and Tread Stocks.

| Sample Type | Amount of Monomer (ml) | Load at Max. Load (N) | Energy to Break (J) |
| --- | --- | --- | --- |
| Tread/Tread | 0.12 | 146.41 | 29.31 |
| Tread/Tread | 0.12 | 146.12 | 29.34 |
| Tread/Tread | 0.12 | 118.27 | 21.51 |
| Mean | | 136.93 | 26.72 |
| Carcass/Carcass | 0.16 | 362.55 | 50.16 |
| Carcass/Carcass | 0.16 | 421.78 | 53.61 |
| Carcass/Carcass | 0.16 | 296.06 | 45.30 |
| Mean | | 360.13 | 49.69 |
| Carcass/Tread | 0.14 | 287.73 | 58.74 |
| Carcass/Tread | 0.14 | 300.87 | 56.43 |
| Carcass/Tread | 0.15 | 218.00 | 43.35 |
| Mean | | 268.86 | 52.84 |

EXAMPLE 23

Metal-To-Metal Bonding

A catalyst solution was prepared by dissolving 9.021 g of $RuCl_2(PCy_3)_2$=CHPh in 1.5 ml of $CH_2Cl_2$. The catalyst solution was applied to three grit-blasted steel coupons that were then bonded to other grit-blasted steel coupons with 0.02–0.03 ml of ENB monomer per coupon as described in Example 1, except that the monomer was applied to the catalyst coated metal coupon. The other steel coupon was immediately mated to the treated surface and weighted down with a 100 g weight. After three days of sitting at ambient conditions, all three samples could not be pulled apart by hand. The samples were analyzed on an Instron using a lap shear tensile test and showed a mean load at break of 375.99 (N).

EXAMPLE 24

Glass-To-Glass Bonding

A catalyst solution was prepared by dissolving 0.040 g of $RuCl_2(PCy_3)_2$=CHPh in 3.0 ml of $CH_2Cl_2$. The catalyst solution was applied to three glass microscope slides that were then bonded to other glass microscope slides with 0.15–0.20 ml of ENB monomer per slide as described in Example 1, except that not all the catalyst solution was used—just a sufficient amount to cover the defined area. The solvent was allowed to evaporate for 3 to 4 minutes before the ENB was pipetted onto the catalyst containing surface. Immediately, the other glass slide was mated onto the other slide and held in place with a 100 g weight. After 1.5 hours, the two glass slides were examined and found to be held together as the substrates could be picked up without falling apart.

EXAMPLE 25

Paper-To-Paper Bonding

A catalyst solution prepared from 0.040 g of $RuCl_2(PCy_3)_2$=CHPh in 3 ml of $CH_2Cl_2$ was applied to a single piece of laboratory filter paper as described in Example 1. The solvent was allowed to evaporate for approximately 2 minutes. ENB monomer was applied to another piece of filter paper. Immediately, the two paper surfaces were mated and held in place with a 100 g weight. After 1.5 hours, the two paper pieces were examined and found to be held together and could not be pulled apart.

EXAMPLE 26

Spray Application of $RuCl_2(PCy_3)_2$=CHPh and Coating Formation using ENB on Various Substrates A catalyst solution was prepared by dissolving 0.75 g of $RuCl_2(PCy_3)_2$=CHPh in 25 ml of $CH_2Cl_2$. This solution was then spray applied onto a 7.62 cm×15.24 cm substrate surface, which had been previously wiped with acetone to remove any surface contamination, in a sweeping pattern until even-appearing coverage was obtained. The solvent was allowed to evaporate for 30 minutes in the open laboratory atmosphere leaving the surface coated with catalyst. Black Santoprene®, manila Santoprene®, acrylonitrile butadiene styrene (ABS), polypropylene, polymethylmethacrylate (PMMA), aluminum, chromated aluminum, stainless steel, polycarbonate sheet, Delrin acetal resin sheet, Mannington Classic uncoated embossed polyvinyl (PVC) flooring (designated "MC"), and Tarkett/Domco polyvinyl flooring (designated "T") were sprayed with ENB monomer and allowed to dry. Both static and kinetic coefficients of friction of all the coated specimens were measured by determining drag resistance on an Instron (see P. R. Guévin, "Slip Resistance," in *Paint and Coating Testing Manual, Fourteenth Edition of the Gardner-Sward Handbook*, J. V. Koleske, ed., ASTM Manual Series: MNL 17, ASTM, Philadelphia, 1995, Chapter 50.) The results are shown below in Tables 10 and 11. For all samples the static and kinetic coefficients of friction were lower after spray coating with ENB compared to the control (e.g., shown in the Table as Aluminum-C) of that sample except in a few cases. Lower static and kinetic coefficients of friction indicate improved surface lubricity.

TABLE 10

Static and Kinetic Coefficient of Friction Results for Metal Substrates Spray Coated with ENB.

| Sample ID | Static COF Mean | Static COF Std Dev | Kinetic COF Mean | Kinetic COF Std Dev |
|---|---|---|---|---|
| Aluminum-1 | 0.440 | 0.086 | 0.107 | 0.011 |
| Aluminum-2 | 0.307 | 0.078 | 0.155 | 0.017 |
| Aluminum-3 | 0.277 | 0.041 | 0.143 | 0.013 |
| Aluminum-4 | 0.244 | 0.047 | 0.154 | 0.042 |
| Aluminum-C | 0.746 | 0.150 | 0.242 | 0.118 |
| Chromated Aluminum-1 | 0.263 | 0.093 | 0.112 | 0.025 |
| Chromated Aluminum-2 | 0.287 | 0.039 | 0.162 | 0.018 |
| Chromated Aluminum-3 | 0.341 | 0.076 | 0.095 | 0.018 |
| Chromated Aluminum-4 | 0.256 | 0.042 | 0.152 | 0.014 |
| Chromated Aluminum-C | 0.755 | 0.430 | 0.233 | 0.138 |
| Stainless Steel-1 | 0.397 | 0.062 | 0.119 | 0.013 |
| Stainless Steel-2 | 0.297 | 0.049 | 0.119 | 0.005 |
| Stainless Steel-3 | 0.259 | 0.031 | 0.131 | 0.015 |
| Stainless Steel-4 | 0.256 | 0.063 | 0.121 | 0.005 |
| Stainless Steel-C | 0.244 | 0.008 | 0.184 | 0.006 |

TABLE 11

Static and Kinetic Coefficient of Friction Results for Plastic Substrates Spray Coated with ENB.

| Sample ID | Static COF Mean | Static COF Std Dev | Kinetic COF Mean | Kinetic COF Std Dev |
|---|---|---|---|---|
| ABS-1 | 0.216 | 0.068 | 0.073 | 0.011 |
| ABS-2 | 0.436 | 0.224 | 0.075 | 0.048 |
| ABS-3 | 0.343 | 0.108 | 0.077 | 0.032 |
| ABS-4 | 0.172 | 0.023 | 0.086 | 0.015 |
| ABS-C | 0.291 | 0.021 | 0.163 | 0.011 |
| Delrin-1 | 0.550 | 0.067 | 0.215 | 0.039 |
| Delrin-2 | 0.475 | 0.080 | 0.188 | 0.012 |
| Delrin-C | 0.599 | 0.023 | 0.521 | 0.031 |
| EPDM-1 | 0.535 | 0.088 | 0.265 | 0.040 |
| EPDM-2 | 0.630 | 0.078 | 0.305 | 0.034 |
| EPDM-3 | 0.749 | 0.069 | 0.174 | 0.015 |
| EPDM-4 | 0.296 | 0.031 | 0.183 | 0.012 |
| EPDM-C | 2.547 | 0.036 | 1.997 | 0.896 |

TABLE 11-continued

Static and Kinetic Coefficient of Friction Results for Plastic Substrates Spray Coated with ENB.

| Sample ID | Static COF Mean | Static COF Std Dev | Kinetic COF Mean | Kinetic COF Std Dev |
|---|---|---|---|---|
| MC-1 | 0.514 | 0.063 | 0.419 | 0.084 |
| MC-2 | 0.631 | 0.187 | 0.334 | 0.022 |
| MC-3 | 0.654 | 0.097 | 0.465 | 0.025 |
| MC-4 | 0.589 | 0.061 | 0.399 | 0.042 |
| MC-C | 1.810 | 0.198 | 1.031 | 0.243 |
| Polycarbonate-1 | 1.364 | 0.142 | 0.083 | 0.000 |
| Polycarbonate-2 | 0.989 | 0.048 | 0.164 | 0.048 |
| Polycarbonate-3 | 0.674 | 0.162 | 0.178 | 0.028 |
| Polycarbonate-4 | 0.211 | 0.034 | 0.187 | 0.000 |
| Polycarbonate-C | 0.963 | 0.263 | 0.301 | 0.011 |
| PMMA-1 | 0.392 | 0.156 | 0.083 | 0.031 |
| PMMA-2 | 0.322 | 0.187 | 0.086 | 0.027 |
| PMMA-3 | 0.433 | 0.108 | 0.150 | 0.054 |
| PMMA-4 | 0.402 | 0.176 | 0.083 | 0.000 |
| PMMA-C | 0.517 | 0.062 | 0.386 | 0.018 |
| Polypropylene-1 | 0.174 | 0.029 | 0.040 | 0.057 |
| Polypropylene-2 | 0.145 | 0.016 | 0.110 | 0.026 |
| Polypropylene-3 | 0.187 | 0.044 | 0.122 | 0.010 |
| Polypropylene-4 | 0.161 | 0.041 | 0.077 | 0.019 |
| Polypropylene-C | 0.394 | 0.056 | 0.225 | 0.057 |
| Black Santoprene-1 | 0.369 | 0.064 | 0.143 | 0.009 |
| Black Santoprene-2 | 0.332 | 0.026 | 0.145 | 0.064 |
| Black Santoprene-3 | 0.290 | 0.022 | 0.100 | 0.027 |
| Black Santoprene-4 | 0.253 | 0.008 | 0.099 | 0.021 |
| Black Santoprene-C | 2.581 | 0.033 | 2.204 | 0.115 |
| Manila Santoprene-1 | 0.282 | 0.021 | 0.080 | 0.011 |
| Manila Santoprene-2 | 0.364 | 0.026 | 0.107 | 0.072 |
| Manila Santoprene-3 | 0.272 | 0.023 | 0.112 | 0.021 |
| Manila Santoprene-4 | 0.287 | 0.037 | 0.080 | 0.010 |
| Manila Santoprene-C | 1.050 | 0.063 | 1.065 | 0.562 |
| T-1 | 1.379 | 0.162 | 0.579 | 0.022 |
| T-2 | 1.317 | 0.129 | 0.530 | 0.058 |
| T-C | 4.328 | 0.300 | −0.016 | 0.023 |

Adhesion measurements were determined by scoring a crosshatch pattern with a razor blade lightly into the coating surface. Five lines approximately 3.2 mm apart and another five lines approximately 3.2 mm apart in crossing pattern. A 50.8–63.5 mm long strip of 25.4 mm width Scotch masking tape (2500-3705) was applied over the crosshatched area and pressed smooth with a finger. After a second or two the tape was pulled quickly from the surface. An adhesion ranking scale was set up with 1 being the best and 5 being the worst (see Table 12).

TABLE 12

Crosshatch Adhesion Test Definitions.

| Value | Description |
|---|---|
| 1 | Very excellent-nothing on tape |
| 2 | Excellent-just crosshatch pattern |
| 3 | Good-crosshatch pattern and specks at edges |
| 4 | Fair-crosshatch and between lines |
| 5 | Poor-everything pulled up |

Adhesion ratings of poly(ENB) coating to rubbery substrates such as Santoprene® and EPDM are shown in Table 13. They show that both Santoprene® specimens gave excellent adhesion with only crosshatch pattern seen on the tape. EPDM adhesion was only a 4 with a single poor coating and 1 with a second uniform coating. As long as a good uniform coating of poly(ENB) was applied, good adhesion to rubbery substrates was observed.

TABLE 13

Crosshatch Adhesion Test Results for Poly(ENB) Coatings on Various Substrates.

| Sample ID | Adhesion rating | Type of Substrate |
|---|---|---|
| Manila Santoprene-4 | 2 | rubbery |
| Black Santoprene-1 | 2 | rubbery |
| EPDM-1 | 4 | rubbery |
| EPDM-4 | 1 | rubbery |
| Aluminum-4 | 2 | metal |
| Chromated Aluminum-4 | 2 | metal |
| Stainless Steel-4 | 1 | metal |
| Polypropylene-4 | 2 | plastic |
| ABS-4 | 1 | plastic |
| Propylene Carbonate-4 | 1 | plastic |
| PMMA-1 | 2 | plastic |
| MC-4 | 5 | flooring |
| T-2 | 5 | flooring |
| Delrin-2 | 5 | flooring |
| Silicon Wafer | 2 | inorganic |
| Teflon | 1–2 | plastic |

EXAMPLE 27

Spray Application of $RuCl_2(PCy_3)_2$=CHPh and Formation of Layered Coatings

A catalyst solution was prepared by dissolving 0.75 g of $RuCl_2(PCy_3)_2$=CHPh in 25 ml of $CH_2Cl_2$. This solution was then spray applied onto the surface of four 7.62 cm×15.24 cm pieces of EPDM, which had been previously wiped with acetone to remove any surface contamination, in a sweeping pattern until even-appearing coverage was obtained. The solvent was allowed to evaporate for 30 minutes in the open laboratory atmosphere leaving the surface coated with catalyst. The samples were then sprayed with ENB monomer and allowed to stand in the open laboratory atmosphere until not tacky. More ENB was applied to EPDM-4 and the sample allowed to dry overnight. The catalyst and resultant polymer levels are reported in Table 14. The increase in coating weight after the second spraying of ENB on EPDM-4 demonstrated that layers of poly(ENB) could be built up on previous a EPDM surface and that the catalyst remained active.

TABLE 14

Catalyst and Monomer Levels for Catalyst/ENB Coated EPDM Samples.

| Sample ID | Substrate wt (g) | Catalyst wt (g) | 1st Polymer wt (g) | 2nd Polymer wt (g) |
|---|---|---|---|---|
| EPDM-1 | 43.1487 | 0.0258 | 0.0555 | |
| EPDM-2 | 43.4636 | 0.0260 | 0.0393 | |
| EPDM-3 | 42.6556 | 0.0236 | 0.0365 | |
| EPDM-4 | 43.9878 | 0.0264 | 0.0440 | 0.2332 |

EXAMPLE 28

Spray Application of $RuCl_2(PCy_3)_2$=CHPh and Formation of Coatings with Other Monomers A catalyst solution was prepared by dissolving 0.75 g of $RuCl_2(PCy_3)_2$=CHPh in 25 ml of $CH_2Cl_2$. This solution was then spray applied onto the surface of an ABS specimen (10.16 cm×15.24 cm), which had been previously wiped with isopropanol to remove any surface contamination, in a sweeping pattern until even-appearing coverage was obtained. The solvent was allowed to evaporate for 30 minutes in a fume hood in the open laboratory atmosphere leaving the surface coated with catalyst. The samples were then sprayed with DCPD, with methylidenenorbornene (MNB), and cyclooctene (CO) monomers and allowed to stand in the open laboratory atmosphere for 2.5 hours before weighing. The catalyst and resultant polymer levels are reported in Table 15. Coefficient of friction data and crosshatch adhesion data are reported in Tables 15 and 16, respectively. For the cyclooctene specimen, no polymer formation was observed; the cyclooctene appeared to volatilize from the surface.

TABLE 15

Coefficient of Friction Data for Different Monomers Spray Applied to ABS.

| Monomer | Catalyst wt (g) | Polymer wt (g) | Static COF Mean | Static COF std dev | Kinetic COF Mean | Kinetic COF std dev |
|---|---|---|---|---|---|---|
| DCPD | 0.167 | 0.948 | 0.25 | 0.03 | 0.11 | 0.01 |
| MNB | 0.125 | 0.142 | 0.27 | 0.08 | 0.10 | 0.01 |
| CO | 0.248 | — | 0.27 | 0.08 | 0.10 | 0.01 |

TABLE 16

Cross-Hatch Adhesion Data[a] for Different Monomers Spray Applied to ABS.

| Monomer | Adhesion Rating |
|---|---|
| DCPD | 1 |
| MNB | 3 |

[a] 1 = Excellent-nothing on tape; 2 = Excellent-just crosshatch pattern; 3 = Good-crosshatch pattern and specks at edges; 4 = Fair-crosshatch and between lines; 5 = Poor-everything pulled up.

EXAMPLE 29

Coating Formation Using MoTB Catalyst and ENB

A catalyst solution was prepared by dissolving 0.1692 g of 2,6-diisopropylphenylimido neophylidene molybdenum (VI) bis-t-butoxide (MOTB) in 5 ml of $CH_2Cl_2$. The catalyst solution was applied to a 10.16 cm×15.24 cm ABS substrate in the glove box as described in Example 12. The catalyst thickened and the surface roughened with thick brush marks because the solvent dissolved the ABS surface. Using a pipette, ENB monomer was applied in front of a 1 mil draw down bar and the bar was pulled down across the catalyst coated area. Upon attempting to draw down the bar a second time, the newly formed coating scratched because the monomer polymerized so quickly. This gave a wrinkled, dark brown coating in the catalyst coated area and a chalky yellow edge were the ENB monomer did not touch.

To eliminate this surface dissolution problem, another MoTB catalyst solution (0.1192 g of MoTB in 3 ml $CH_2Cl_2$) was again applied to a surface, but this time to a 10.16 cm×15.24 cm chromated aluminum (AC) substrate. A more uniform coating of poly(ENB) formed on the surface. The chromated alumina coated specimen (AC) showed a static coefficient of friction of 0.44±0.03 and a kinetic coefficient of friction of 0.14±0.05. These data were obtained for the AC specimen only as the ABS surface was too rough as described above. Cross-hatch adhesion data for both specimens are reported in Table 17.

TABLE 17

Cross-Hatch Adhesion Data[a] for Different Monomers/Substrates.

| Monomer | Substrate | Adhesion Rating |
|---------|-----------|-----------------|
| ENB     | ABS       | 4               |
| ENB     | AC        | 3               |

[a]1 = Excellent-nothing on tape; 2 = Excellent-just crosshatch pattern; 3 = Good-crosshatch pattern and specks at edges; 4 = Fair-crosshatch and between lines; 5 = Poor-everything pulled up.

EXAMPLE 30

Coatings by Application of Catalyst or Monomer in a Polymer Matrix

A matrix solution was prepared (2 g of PMMA, 0.1 g of $RuCl_2(PCy_3)_2=CHPh$, and 50 ml of $CH_2Cl_2$) and applied by spray application to a PMMA substrate. The coating was not uniform so three to four drops of the above matrix solution were applied to the PMMA substrate and spread out using a glass rod. On drying, a clear uniform coating formed which was sprayed with ENB.

Changes in surface tension of the coatings were evaluated using a set of Accu-Dyne solutions. These solutions are used to match their surface tensions with the surface in question. A match in surface tension is determined when the applied solution wets the surface being tested. The surface tension of the solution then correlates with the surface tension of the surface.

No change in surface tension was observed before and after spraying ENB on the PMMA/$RuCl_2(PCy_3)_2=CHPh$ matrix described above ($\gamma=38$ dynes/cm). More $RuCl_2(PCy_3)_2=CHPh$ was added to the PMMA/$RuCl_2(PCy_3)_2=CHPh$ matrix thus bringing the total to 0.35 g catalyst in the PMMA matrix. This new solution was coated onto new 5.08 cm×5.08 cm PMMA substrate, dried, and then sprayed with ENB. The surface tension remained 38 dynes/cm. Again, another addition of catalyst brought the new total to 0.55 g $RuCl_2(PCy_3)_2=CHPh$ in the PMMA matrix. This surface, which was processed as described above, displayed a surface tension of 34 dynes/cm. This result demonstrated that the catalyst remained active when incorporated into a polymer matrix and that coatings can be applied over this active surface.

A solution containing 0.25 g of $RuCl_2(PCy_3)_2=CHPh$ in 15 ml of $CH_2Cl_2$ was sprayed onto a 10.16 cm×15.24 cm PMMA substrate surface to provide 0.0384 g of catalyst onto the surface on drying. The overcoat PMMA/ENB matrix (2 ml of ENB, 1 gm of PMMA, in 10 ml of $CH_2Cl_2$) was applied by glass rod to the catalyst coated surface and the resulting surface tension was 46 dynes/cm). This compares to a surface tension of 36 dynes/cm for a control uncoated PMMA substrate.

EXAMPLE 31

Coating Paper by Spray Application of $RuCl_2(PCy_3)_2=CHPh$ and Different Monomers Commercial filter paper (Whatman #41) samples were cut into fifteen dogbone-shaped specimens (11 cm overall length, 40×7.2 mm draw area) and spray coated with a solution of $RuCl_2(PCy_3)_2=CHPh$ as described in Example 8. After drying in the laboratory air for 30 minutes, the specimens were weighed, and then five specimens were spray coated with DCPD (5 ml), five specimens were spray coated with ethylidenenorbornene (8 ml), and five specimens were spray coated with cyclooctene (5 ml) on one side of the paper. After drying for 16 hours in the fume hood, the specimens were weighed to determine the amount of reacted monomer and their tensile properties determined on an Instron (Table 18). Poly(ENB) and poly(DCPD) coated paper dog-bones showed increased maximum load values, while poly(cyclooctene) did not. Statistical analysis (t-test) revealed increased displacement at maximum load for DCPD at the 95% confidence level. Little poly(cyclooctene) formed likely as a result of its high volatility vs ROMP rate.

TABLE 18

Tensile Strength Data for Paper Dog-Bone Specimens[a].

| ID | Monomer | catalyst amt (g) | coating amt (g) | Displacement at max load (mm) [mean/sd] | | Load at max load (Kgf) [mean/sd] | |
|----|---------|------------------|-----------------|------|------|------|------|
| A | ENB | 0.0072 | 0.0941 | 0.624 | 0.187 | 2.636 | 0.190 |
| B | DCPD | 0.0066 | 0.0949 | 0.644 | 0.083 | 3.401 | 0.661 |
| C | Cyclo-octene | 0.0060 | 0.0018 | 0.574 | 0.047 | 0.894 | 1.064 |
| D | — | — | — | 0.514 | 0.051 | 1.024 | 0.189 |

[a]Whatman #41 filter paper, 5 samples each.

EXAMPLE 32

Fiber Coating by Application of $RuCl_2(PCy_3)_2=CHPh$ and Monomer

Kevlar®, Nomex®, and nylon threads (size 69, 0.2032 mm) were cut into 30.48 cm lengths, soaked in a solution containing approximately 0.04 g of $RuCl_2(PCy_3)_2=CHPh$ in 5 ml of $CH_2Cl_2$ for one minute, and allowed to dry in a straight position. After 20 minutes the threads were sprayed with 8 ml of ENB. After two hours the threads appeared straight and stiff. Tensile properties for these specimens were compared to uncoated threads on an Instron (Table 19). No real differences in tensile data were observed. However, each thread was thicker providing evidence that the threads were indeed coated.

TABLE 19

Tensile Properties of ENB Coated and Uncoated Threads.

| Thread | Load @ Max Load (Kg) | Max. % Strain | Thickness (mm)[a] |
|--------|----------------------|---------------|-------------------|
| Kevlar | 3.947 ± 1.089 | 9.310 ± 2.354 | 0.27 |
| Kevlar - coated | 4.330 ± 0.008 | 10.659 ± 1.056 | 0.31 |
| Nylon | 2.633 ± 0.477 | 59.069 ± 17.614 | 0.26 |
| Nylon - coated | 2.601 ± 0.651 | 31.154 ± 8.324 | 0.30 |
| Nomex | 1.893 ± 0.129 | 31.289 ± 3.006 | 0.27 |
| Nomex - coated | 2.018 ± 0.260 | 30.452 ± 6.182 | 0.28 |

[a]These measurements were made with calipers and then verified with a thickness gauge.

EXAMPLE 33

Fabric Coating by Application of $RuCl_2(PCy_3)_2=CHPh$ and Monomer

Strips of cotton, fiberglass, polyester, and aramid fabric were cut to 2.54 cm×15.24 cm geometries, dipped in a solution containing 1.0 g of $RuCl_2(PCy_3)_2=CHPh$ in 100 ml of CH$_2$Cl$_2$ for one minute, and allowed to dry. It was noted that excess catalyst wicked to the fabric surfaces during the drying process. The excess catalyst was shaken from each fabric. All fabrics had a purple color showing that catalyst had adsorbed onto the surface. Approximately 30 ml of ENB was sprayed onto both sides of the fabric strips. All fabric samples stiffened as the polymerization occurred. Tensile properties were determined for six of each coated and uncoated specimen on an Instron (Table 20). While stiff, the fabrics could easily be bent like uncoated fabric.

By coating poly(ENB) on the polyester fabric the load at peak almost doubled, but differences in displacement or % strain were slight. This suggests that the strength of the tightly woven polyester fabric is increased strictly by addition of poly(ENB). Aramid and cotton fabrics showed displacement and % strain at peak to be halved and load at peak to be slightly increased or no change, respectively. Thus, these fabrics lose some of their stretchability by the addition of poly(ENB), but lose none of their strength. For fiberglass, the load at peak and energy to break increase significantly, while displacement and % strain at peak show no change.

TABLE 20

Tensile Properties of ENB Coated and Uncoated Fabrics[a].

| ID | Material Type | Displacement at Peak (mm) [mean/sd] | | % Strain at Peak (%) [mean/sd] | | Load at Peak (kN) [mean/sd] | | Energy to Break (J) [mean/sd] | |
|---|---|---|---|---|---|---|---|---|---|
| Control | Polyester | 10.882 | 0.481 | 42.841 | 1.892 | 0.889 | 0.045 | 7.036 | 0.577 |
| 8165-27 A | Polyester | 11.575 | 0.181 | 45.571 | 0.712 | 1.511 | 0.076 | 7.723 | 0.866 |
| Control | Aramid | 15.500 | 0.746 | 61.417 | 2.937 | 0.168 | 0.008 | 1.397 | 0.072 |
| 8165-27 B | Aramid | 8.282 | 1.616 | 32.605 | 6.364 | 0.237 | 0.019 | 1.758 | 0.289 |
| Control | Cotton | 6.972 | 0.404 | 27.448 | 1.590 | 0.702 | 0.022 | 2.102 | 0.218 |
| 8165-27 C | Cotton | 3.380 | 0.470 | 13.307 | 1.850 | 0.805 | 0.106 | 1.951 | 0.227 |
| Control | Fiberglass | 2.925 | 0.034 | 11.516 | 1.197 | 0.641 | 0.085 | 1.841 | 0.858 |
| 8165-27 D | Fiberglass | 3.050 | 0.166 | 12.008 | 0.653 | 1.917 | 0.203 | 8.669 | 3.042 |

[a]Determined using six 1" × 6" strips of each fabric.

What is claimed is:

1. A method for bonding a first substrate surface to a second substrate surface said first substrate surface being different than said second substrate, comprising:
   (a) providing a catalyst at the first substrate surface said catalyst being applied diluted in a liquid carrier containing water;
   (b) providing a metathesizable material between the first substrate surface and the second substrate surface; and
   (c) contacting the catalyst on the first substrate surface with the metathesizable material so that the metathesizable material undergoes a metathesis reaction at normal ambient conditions without an external energy source and bonds the first substrate surface to the second substrate surface.

2. A method according to claim 1 wherein one of the substrates comprises an elastomeric material.

3. A method according to claim 2 wherein the elastomeric material is a thermoplastic elastomer.

4. A method according to claim 1 wherein one of the first or second substrates comprises a metallic material and the other first or second substrate comprises an elastomeric material.

5. A method according to claim 4 wherein the metallic material comprises steel and the elastomeric material is selected from natural rubber, polychloroprene, polybutadiene, polyisoprene, styrene-butadiene copolymer rubber, acrylonitrile-butadiene copolymer rubber, ethylene-propylene copolymer rubber, ethylene-propylene-diene terpolymer rubber, butyl rubber, brominated butyl rubber, alkylated chlorosulfonated polyethylene rubber, hydrogenated nitrile rubber, silicone rubber, fluorosilicone rubber, poly(n-butyl acrylate), thermoplastic elastomer and mixtures thereof.

6. A method according to claim 4 wherein the elastomeric material is substantially cured.

7. A method according to claim 1 wherein the first substrate comprises a tire carcass and the second substrate comprises a tire tread.

8. A method according to claim 7 wherein the bonding in step (c) occurs within one hour.

9. A method according to claim 1 wherein step (b) comprises applying the metathesizable material to the second substrate surface and step (c) comprises contacting the catalyst on the first substrate surface and the metathesizable material-applied second substrate surface.

10. A method according to claim 9 wherein the metathesizable material is in the form of a liquid, paste or meltable solid.

11. A method according to claim 9 wherein the metathesizable material is included as a component in a multi-component composition.

12. A method according to claim 1 wherein at least one of the substrates is substantially cured elastomeric material.

13. A method according to claim 1 wherein steps (a)–(c) occur at room temperature.

14. A method according to claim 1 wherein step (a) comprises applying a catalyst onto the first substrate surface.

15. A method according to claim 14 wherein the catalyst is applied dissolved or mixed into a liquid carrier fluid.

16. A method according to claim 14 wherein the catalyst is included as a component in a multi-component composition.

17. A method according to claim 14 wherein the catalyst is applied to said first substrate by way of applying said carrier and the carrier is dried so that said catalyst remains on the substrate surface in direct contact with the first substrate surface.

18. A method according to claim 1 wherein the catalyst is selected from at least one of a rhenium compound, ruthenium compound, osmium compound, molybdenum compound, tungsten compound, titanium compound, niobium compound, iridium compound and MgCl$_2$.

19. A method according to claim 18 wherein the catalyst is selected from a ruthenium compound, a molybdenum compound, iridium compound and an osmium compound.

20. A method according to claim 19 wherein the catalyst has a structure represented by

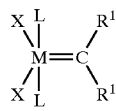

wherein M is Os, Ru or Ir; each $R^1$ is the same or different and is H, alkenyl, alkynyl, alkyl, aryl, alkaryl, aralkyl, carboxylate, alkoxy, alkenylalkoxy, alkenylaryl, alkynylalkoxy, aryloxy, alkoxycarbonyl, alkylthio, alkylsulfonyl or alkylsulfinyl; X is the same or different and is an anionic ligand group; and L is the same or different and is a neutral electron donor group.

21. A method according to claim 20 wherein X is Cl, Br, I, F, CN, SCN, or $N_3$; L is $Q(R^2)_a$ wherein Q is P, As, Sb or N; $R^2$ is H, cycloalkyl, alkyl, aryl, alkoxy, arylate or a heterocyclic ring; and a is 1, 2 or 3; M is Ru; and $R^1$ is H, phenyl, —CH=C(phenyl)$_2$, —CH=C(CH$_3$)$_2$ or —C(CH$_3$)$_2$(phenyl).

22. A method according to claim 21 wherein the catalyst is a phosphine-substituted ruthenium carbene.

23. A method according to claim 22 wherein the catalyst is bis(tricyclohexylphosphine)benzylidene ruthenium (IV) dichloride.

24. A method according to claim 19 wherein the catalyst comprises a bimetallic catalyst having a structure represented by

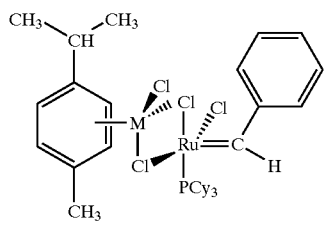

wherein M is Ru, Os or Rh.

25. A method according to claim 19 wherein the catalyst has a structure represented by

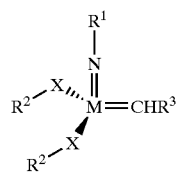

wherein M is Mo or W; X is O or S; $R^1$ is an alkyl, aryl, aralkyl, alkaryl, haloalkyl, haloaryl, haloaralkyl, or a silicon-containing analog thereof; $R^2$ are each individually the same or different and are an alkyl, aryl, aralkyl, alkaryl, haloalkyl, haloaryl, haloaralkyl, or together form a heterocyclic or cycloalkyl ring; and $R^3$ is alkyl, aryl, aralkyl or alkaryl.

26. A method according to claim 1 wherein the catalyst is stable in the presence of moisture and oxygen and can initiate polymerization of the metathesizable material upon contact at room temperature.

27. A method according to claim 1 wherein the metathesizable material includes at least one reactive unsaturated functional group.

28. A method according to claim 27 wherein the metathesizable material comprises an olefin.

29. A method according to claim 28 wherein the metathesizable material is selected from ethene, α-alkene, acyclic alkene, acyclic diene, acetylene, cyclic alkene, cyclic polyene and mixtures thereof.

30. A method according to claim 29 wherein the metathesizable material comprises a cycloolefin.

31. A method according to claim 30 wherein the metathesizable material is a monomer or oligomer selected from norbornene, cycloalkene, cycloalkadiene, cycloalkatriene, cycloalkatetraene, aromatic-containing cycloolefin and mixtures thereof.

32. A method according to claim 31 wherein the metathesizable material is a norbornene monomer or oligomer.

33. A method according to claim 32 wherein the norbornene has a structure represented by

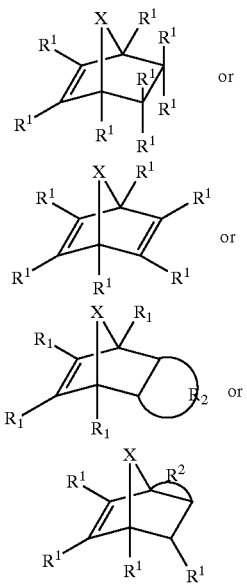

wherein X is $CH_2$, $CHR^3$, $C(R^3)_2$, O, S, N—$R^3$, P—$R^3$, O=P—$R^3$, $Si(R^3)_2$, B—$R^3$ or As—$R^3$; each $R^1$ is independently H, $CH_2$, alkyl, alkenyl, cycloalkyl, cycloalkenyl, aryl, alkaryl, aralkyl, halogen, halogenated alkyl, halogenated alkenyl, alkoxy, oxyalkyl, carboxyl, carbonyl, amido, (meth) acrylate-containing group, anhydride-containing group, thioalkoxy, sulfoxide, nitro, hydroxy, keto, carbamato, sulfonyl, sulfinyl, carboxylate, silanyl, cyano or imido; $R^2$ is a fused aromatic, aliphatic or heterocyclic or polycyclic ring; and $R^3$ is alkyl, alkenyl, cycloalkyl, cycloalkenyl, aryl, alkaryl, aralkyl or alkoxy.

34. A method according to claim 33 wherein the metathesizable material comprises ethylidenenorbornene monomer or oligomer.

35. A method according to claim 1 wherein the metathesizable material comprises liquid ethylidenenorbornene monomer.

36. A method according to claim 1 wherein the the metathesizable material is applied in the form of a liquid that is substantially 100 percent reactive.

37. A method according to claim 1 wherein the method is substantially free of the use of volatile organic solvents.

38. A method according to claim 1 wherein step (a) comprises applying a ruthenium catalyst in the liquid carrier to the first substrate surface, step (b) comprises applying a metathesizable liquid norbornene monomer to the second substrate surface and step (c) comprises contacting the catalyst-applied first substrate surface and the monomer-applied second substrate surface.

39. The method according to claim 1 wherein the substrates bonded are tire tread and tire carcass said tire tread and said tire carcass are brought into contact with each other after applying said catalyst and the metathesizable material wherein a metathesis reaction occurs to bond the tire tread to the tire carcass.

40. A method according to claim 39 wherein step (c) occurs at room temperature.

41. A method according to claim 39 wherein the tire tread comprises precured retread stock.

42. A method according to claim 39 wherein the metathesizable material comprises norbornene monomer or oligomer having a structure represented by

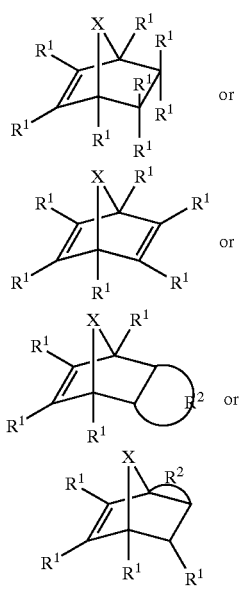

wherein X is $CH_2$, $CHR^3$, $C(R^3)_2$, O, S, N—$R^3$, P—$R^3$, O=P—$R^3$, $Si(R^3)_2$, B—$R^3$ or As—$R^3$; each $R^1$ is independently H, $CH_2$, alkyl, alkenyl, cycloalkyl, cycloalkenyl, aryl, alkaryl, aralkyl, halogen, halogenated alkyl, halogenated alkenyl, alkoxy, oxyalkyl, carboxyl, carbonyl, amido, (meth)acrylate-containing group, anhydride-containing group, thioalkoxy, sulfoxide, nitro, hydroxy, keto, carbamato, sulfonyl, sulfinyl, carboxylate, silanyl, cyano or imido; $R^2$ is a fused aromatic, aliphatic or heterocyclic or polycyclic ring; and $R^3$ is alkyl, alkenyl, cycloalkyl, cycloalkenyl, aryl, alkaryl, aralkyl or alkoxy; and the catalyst is selected from a ruthenium compound, a molybdenum compound and an osmium compound.

43. A method according to claim 39 wherein the catalyst is applied to the tire carcass and the metathesizable material is applied to the tire tread.

44. A method for bonding a metallic substrate surface to an elastomeric substrate surface comprising:
    (a) applying a catalyst to the metallic substrate surface said catalyst being diluted in a liquid carrier containing water;
    (b) applying a metathesizable material to the elastomeric substrate surface; and
    (c) bringing the metallic substrate surface and the elastomeric substrate surface together to contact the catalyst and the metathesizable material and bonding said substrates together in a metathesis reaction at normal ambient conditions without an external energy source.

45. A method according to claim 44 wherein step (c) occurs at room temperature.

46. A method according to claim 44 wherein the elastomeric substrate is a substantially cured elastomeric material.

47. A method according to claim 44 wherein the metathesizable material comprises norbornene monomer or oligomer having a structure represented by

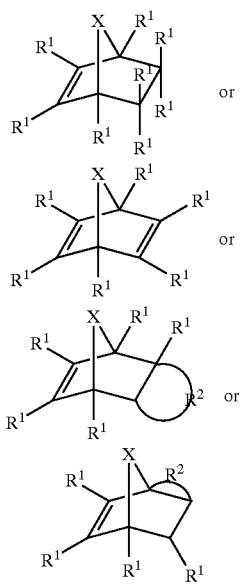

wherein X is $CH_2$, $CHR^3$, $C(R^3)_2$, O, S, N—$R^3$, P—$R^3$, O=P—$R^3$, $Si(R^3)_2$, B—$R^3$ or As—$R^3$; each $R^1$ is independently H, $CH_2$, alkyl, alkenyl, cycloalkyl, cycloalkenyl, aryl, alkaryl, aralkyl, halogen, halogenated alkyl, halogenated alkenyl, alkoxy, oxyalkyl, carboxyl, carbonyl, amido, (meth)acrylate-containing group, anhydride-containing group, thioalkoxy, sulfoxide, nitro, hydroxy, keto, carbamato, sulfonyl, sulfinyl, carboxylate, silanyl, cyano or imido; $R^2$ is a fused aromatic, aliphatic or heterocyclic or polycyclic ring; and $R^3$ is alkyl, alkenyl, cycloalkyl, cycloalkenyl, aryl, alkaryl, aralkyl or alkoxy; and the catalyst is selected from a ruthenium compound, a molybdenum compound and an osmium compound.

48. A method according to claim 47 wherein step (c) occurs at room temperature.

* * * * *